(12) United States Patent
Foshey et al.

(10) Patent No.: US 11,752,700 B2
(45) Date of Patent: Sep. 12, 2023

(54) SYSTEMS AND METHODS FOR FORMULATING MATERIAL IN A DATA-DRIVEN MANNER

(71) Applicants: Massachusetts Institute of Technology, Cambridge, MA (US); BASF SE, Ludwigshafen am Rhein (DE)

(72) Inventors: Michael J. Foshey, Quincy, MA (US); Timothy P. Erps, Salem, MA (US); Mina Konakovic Lukovic, Belgrade (RS); Wojciech Matusik, Lexington, MA (US); Wan Shou, Allston, MA (US); Klaus Stoll, Ludwigshafen (DE); Bernhard Ulrich von Vacano, Ludwigshafen (DE); Hanns Hagen Goetzke, Ludwigshafen (DE)

(73) Assignees: MASSACHUSETTS INSTITUTE OF TECHNOLOGY, Cambridge, MA (US); BASF SE ( * ) Notice: Subject to any disclaimer, the term of this patent is extended or adjusted under 35 U.S.C. 154(b) by 181 days.

(21) Appl. No.: 17/061,548

(22) Filed: Oct. 1, 2020

(65) Prior Publication Data
US 2021/0095141 A1 Apr. 1, 2021

Related U.S. Application Data

(60) Provisional application No. 62/909,177, filed on Oct. 1, 2019.

(51) Int. Cl.
B29C 64/393 (2017.01)
C09D 11/101 (2014.01)
(Continued)

(52) U.S. Cl.
CPC .......... *B29C 64/393* (2017.08); *B29C 64/112* (2017.08); *B29C 64/124* (2017.08); (Continued)

(58) Field of Classification Search
CPC ... C09D 11/101; B29C 64/393; B29C 64/124; B29C 64/112; B33Y 70/00; G06F 18/24155
See application file for complete search history.

(56) References Cited

U.S. PATENT DOCUMENTS 5,265,004 A * 11/1993 Schultz ............... G05B 19/054
700/18
5,776,359 A 7/1998 Schultz et al.
(Continued)

OTHER PUBLICATIONS

Fergani, Oma, When deep learning meets 3D printing, 2019, https://www.linkedin.com/pulse/when-deep-learning-meets-3d-printing-omar-fergani (Year: 2019).*
(Continued)

*Primary Examiner* — Peter Radkowski
(74) *Attorney, Agent, or Firm* — Barnes & Thornburg, LLP

(57) ABSTRACT

Systems and methods for optimizing the formulation of materials are provided. The systems and methods employ a data-driven, iterative approach to derivate optimal material formulations. One portion of the system includes a sample automation system that outputs the material samples to be tested, and a second portion of the system includes an optimization engine that analyzes data extracted from the material samples and generates additional formulations for materials to be printed and tested. This process continues so that optimal material formulations can be determined based on desired mechanical properties of the material to be optimized. The optimization engine can further be capable of predicting results of formulation that have not yet been
(Continued)

tested and using those predictions to further drive the next suggested materials to be tested.

12 Claims, 9 Drawing Sheets

(51) Int. Cl.
    *B29C 64/124*     (2017.01)
    *B29C 64/112*     (2017.01)
    *B33Y 70/00*     (2020.01)
    *G06F 18/2415*     (2023.01)

(52) U.S. Cl.
    CPC ............ *B33Y 70/00* (2014.12); *C09D 11/101* (2013.01); *G06F 18/24155* (2023.01)

(56) References Cited

U.S. PATENT DOCUMENTS

| | | | |
|---|---|---|---|
| 7,166,470 B2* | 1/2007 | Giaquinta | H01F 41/34 436/100 |
| 7,427,506 B2* | 9/2008 | Garcia-Franco | G01N 33/445 436/56 |
| 2003/0219906 A1* | 11/2003 | Giaquinta | H01F 41/18 436/180 |
| 2006/0280866 A1* | 12/2006 | Marquez | C23C 16/00 239/290 |
| 2007/0148697 A1* | 6/2007 | Delaney, Jr. | B01J 19/0046 435/7.1 |
| 2015/0100244 A1* | 4/2015 | Hannum | G16B 30/00 702/19 |

OTHER PUBLICATIONS

Ludwig, A. Discovery of new materials using combinatorial synthesis and high-throughput characterization of thin-film materials libraries combined with computational methods. npj Comput Mater 5, 70 (2019). https://doi.org/10.1038/s41524-019-0205-0 (Year: 2019).*
Sharriari et al., An Entropy Search Portfolio for Bayesian Optimization, https://doi.org/10.48550/arXiv.1406.4625 (Year: 2015).*
Bedard et al. Reconfigurable system for automated optimization of diverse chemical reactions, Science, Sep. 21, 2018, vol. 361, Issue 6408, pp. 1220-1225, DOI: 10.1126/science.aat0650 (Year: 2018).*
Ren et al., Accelerated discovery of metallic glasses through iteration of machine learning and high-throughput experiments, Science Advances, Apr. 13, 2018, vol. 4, Issue 4, DOI: 10.1126/sciadv.aaq156 (Year: 2018).*
F. Häse, L. M. Roch, A. Aspuru-Guzik, Chimera: Enabling hierarchy based multi-objective optimization for self-driving laboratories. Chem. Sci. 9, 7642-7655 (2018). (Year: 2018).*
Antonio, et al. "Structural materials: Properties and selection". Cham, Switzerland: Springer. 2019.
Barszczewska-Rybarek. "A Guide through the Dental Dimethacrylate Polymer Network Structural Characterization and Interpretation of Physico-Mechanical Properties". Materials. 12(24), pp. 4057. 2019.
Bartlett, et al. "A 3D-printed, functionally graded soft robot powered by combustion". Science. 349(6244), pp. 161-165. 2015.
Bédard, et al. "Reconfigurable system for automated optimization of diverse chemical reactions". Science. 361(6408), pp. 1220-1225. 2018.
Bradford, et al. "Efficient multiobjective optimization employing gaussian processes, spectral sampling and a genetic algorithm". Journal of global optimization. 71(2):407-438, 2018.
Burger, et al. "A mobile robotic chemist". Nature. 583(7815), pp. 237-241. 2020.
Coley, et al. "A robotic platform for flow synthesis of organic compounds informed by AI planning". Science. 365(6453), p. eaax1566. 2019.
Deb, et al. "A Fast and Elitist Multiobjective Genetic Algorithm: NSGA-II". IEE Transactions on Evolutionary Computation vol. 6, No. 2, pp. 182-197, Apr. 2002.
Do, et al. "3D printing of scaffolds for tissue regeneration applications". Advanced healthcare materials. 4(12), pp. 1742-1762. 2015.
Epps, et al. "Artificial Chemistry: An Autonomous Quantum Dot Synthesis Bot". Adv. Mater. 32, 2001626. 2020.
Gongora, et al. "A Bayesian experimental autonomous researcher for mechanical design". Science Advances. 6(15), p. eaaz1708. 2020.
Grigoryan, et al. "Multivascular networks and functional intravascular topologies within biocompatible hydrogels". Science. 364(6439), pp. 458-464. 2019.
Katheng, et al. "Evaluation of dimensional accuracy and degree of polymerization of stereolithography photopolymer resin under different postpolymerization conditions: An in vitro study". The Journal of Prosthetic Dentistry. 2020.
Kotz, et al. "Three-dimensional printing of transparent fused silica glass". Nature. 544(7650), pp. 337-339. 2017.
Layani, et al. "Novel materials for 3D printing by photopolymerization". Advanced Materials. 30(41), p. 1706344. 2018.
Li, et al. "Piezoelectric micro-jet devices: A review". Sensors and Actuators A: Physical, 297, 111552. 2019.
Ligon, et al. "Polymers for 3D printing and customized additive manufacturing". Chemical reviews. 117(15), pp. 10212-10290. 2017.
Macleod, et al. "Self-driving laboratory for accelerated discovery of thin-film materials". Science Advances. 6(20). 2020.
McOwen, et al. "3D-printing electrolytes for solid-state batteries". Advanced Materials. 30(18), p. 1707132. 2018.
Shahriari, et al. "Taking the human out of the loop: A review of bayesian optimization". Proceedings of the IEEE. 104(1):148-175, 2016.
Shahriari, et al. "An Entropy Search Portfolio for Bayesian Optimization". ArXiv. abs/1406.4625. 2014.
Sun, et al. "3D printing of interdigitated Li-Ion microbattery architectures". Advanced materials 25(33), pp. 4539-4543. 2013.
Ten Kate, et al. "3D-printed upper limb prostheses: a review". Disability and Rehabilitation: Assistive Technology. 12(3), pp. 300-314. 2017.
Truby, et al. "Printing soft matter in three dimensions". Nature. 540(7633), pp. 371-378. 2016.
Tumbleston, et al. "Continuous liquid interface production of 3D objects". Science. 347(6228), pp. 1349-1352. 2015.
Wang, et al. "A general method to synthesize and sinter bulk ceramics in seconds". Science. 368(6490), pp. 521-526. 2020.
Wegst, et al. "Bioinspired structural materials". Nature materials. 14(1), pp. 23-36. 2015.
Wei, et al. "3D printing of customized li-ion batteries with thick electrodes". Advanced Materials. 30(16), p. 1703027. 2018.
Yin, et al. "Orthogonal programming of heterogeneous micromechano-environments and geometries in three-dimensional biostereolithography". Nature Communications. 9(1). 2018.
Zhang, et al. "3D printing of photopolymers". Polymer Chemistry. 9(13), pp. 1530-1540. 2018.

* cited by examiner

SYSTEMS AND METHODS FOR FORMULATING MATERIAL IN A DATA-DRIVEN MANNER

CROSS REFERENCE TO RELATED APPLICATION

This application claims priority to and the benefit of U.S. Provisional Patent Application No. 62/909,177, filed Oct. 1, 2019, and titled "Systems and Methods for Formulating Material in a Data-Driven Manner," which is incorporated by reference herein in its entirety.

FIELD

The present disclosure relates to systems and methods for formulating optimal materials for various uses by optimizing performance characteristics of the materials, and more particularly relates to utilizing a data-driven approach to quickly and efficiently identify an optimized set of formulations that can be processed into the optimal material(s) for a particular use, such as a formulation of material for producing three-dimensionally printed objects, based on optimized performance characteristics of the formulations and/or materials.

BACKGROUND

Researcher, engineers, scientists, and others invest significant amounts of time, energy, effort, and money into developing ideal materials for desired uses. These efforts are often conducted in a trial-and-error fashion whereby a material is formulated and performance-tested. Based on those test results, a human adjusts the amounts of a formulation being used to produce the material to try and optimize the performance of the resulting material. The generated data is primarily only used to analyze how successful the formulation is. There are no systems or methodologies in place to utilize that data in any structured or rigorous approach that informs the next formulations to be made. At best, a human adjusting the formulations is doing so in a haphazard manner based on the test results, but no computation or structured analysis is performed as the human is making these adjustments.

Combinatorial chemistry can sometimes be used to generate a collection of diverse materials and screen them for desired performance characteristics and properties. For example, many combinations from a diverse chemical library can be used to produce an end product. However, the techniques used in combinatorial chemistry do not necessarily translate successfully into other fields, such as additive manufacturing or three-dimensional (3D) printing. This is because the techniques and systems used in combinatorial chemistry typically involved miniaturized and rapidly manufactured test samples. When equivalent test samples are used in conjunction with materials used for three-dimensional printing, the relevant performance characteristics of the materials are difficult to discern or are otherwise lost in such small sample sizes. Likewise, the materials used in the three-dimensional printing are often difficult to make in the small scales utilized in the combinatorial chemistry techniques.

Simulation is another approach that can be used to optimize samples, such as for more expensive samples. It allows for testing to be done in silico instead of in physical chemistry. This technique allows for rapid iteration of designs to be performed with only computational costs, and a small number of verification samples to be produced at a low cost. However, for this technique to have any success, a proper simulation must exist for the material to be optimized. Often, no such simulation exists.

3D printing is an emerging technique to manufacture objects with complex structures and functions. Among various polymer printing methods, stereolithography (SLA) and polyjet 3D printing have shown promising applications such as robotic assemblies, prosthetics, biologic scaffolds, and customized goods (e.g., shoes). Both of these printing methods require photopolymers as the printing materials. Recently, glass, batteries, high-temperature ceramics, and artificial organs have been successfully 3D printed. However, the development of new 3D printing materials currently relies on domain knowledge of material science, intuition, and the trial-and-error approach, constraining the efficiency and scalability of materials development. Often this approach requires testing an excessive number of samples, generating large waste and undesirable environmental impact, while not always discovering the most optimal solutions. Further constraints may exist because of a limited amount of an initial material supply to be used for testing purposes. Optimizing polymer systems present some unique challenges compared to existing systems and methods. Polymer reactions often include a phase change from liquid to solid, which can be difficult to automate. Additionally, the chemistry behind polymer crosslinking is significantly harder to predict than in other examples. In order to make 3D printing a more widely adopted manufacturing approach, it is critical to accelerate the development of materials with optimized performance. Additionally, to address the challenges of diverse application domains, such as bioengineering and aerospace engineering, materials' performance needs to be optimized for a specific application.

Accordingly, there is a need to develop systems and methods that can more efficiently test various material formulations to optimize the creation of a material for a specific use.

SUMMARY

The present disclosure is directed to systems and methods that employ an optimization engine or algorithm to both utilize data extracted from a test sample to inform another formulation to be tested, as well as predict the performance of materials not yet printed to further inform another formulation to be tested. The system or methodology includes at least two components—a sample automation system that is used to output material to be tested and an optimization engine that receives data about the outputted material and suggests additional formulations of material to be outputted based on the received data. In at least some instances, not only is the additional formulation(s) of material to be outputted based on the properties of the tested material(s), but it can also be based on predicted properties of material(s) not yet printed. While the material being printed can be optimized based on a variety of different parameters, in at least some embodiments those parameters include material toughness, compression modulus, and maximum strength. These parameters can be at odds with each other, for example, strength and toughness are typically conflicting, and thus, attempts to optimize the same may not result in a single "best" formulation. Instead, a set of optimal formulations, referred to herein as a Pareto set, are derived by the systems and methods disclosed herein.

As described herein, the sample automation system can include a semi-automated or automated data-driven pipeline for discovering new materials, e.g., 3D printing materials (i.e., inks, such as photo-curable inks) that are automatically optimized for multiple performance objectives with a limited amount of experiments. To start, base materials or formulations can be identified for use in forming the eventual optimal formulations/materials. For example, with respect to 3D printing inks, base monomers and oligomers can be identified. The systems and methods are then operated to discover the ratios at which to mix the primary formulations to improve the mechanical performance of base inks, based on the parameters or performance objectives, and get the best performing materials. In at least some instances, the best performing materials can have mechanical performance values that exceed the values of cured materials of the base formulations. Where the performance objectives all impact the ability of the material to have a high mechanical performance, a set of optimal solutions, called Pareto front, is provided that encompasses the trade-offs of best performing designs.

One exemplary embodiment of a system for formulating a material includes a sample automation system and an optimization engine. The sample automation system is configured to output one or more batches of material samples. Each batch of the one or more batches includes a plurality of material examples. Further, at least one of the following comprises samples having different properties: (a) the plurality of material samples of each batch; or (b) the material samples of a plurality of batches. The optimization engine is configured to receive data about the one or more batches of material samples outputted by the sample automation system and output one or more subsequently suggested batches of material samples. Each subsequently suggested batch of the one or more subsequently suggested batches includes a plurality of subsequently suggested material samples. The sample automation system is configured to output one or more additional batches of material samples based on the one or more subsequently suggested batches of material samples outputted by the optimization engine.

The optimization engine can be configured to optimize one or more formulations of a material sample based on a plurality of performance objectives. The plurality of performance objectives can include an overall Pareto front, with the overall Pareto front being based on attempts to maximize each of material toughness, compression modulus, and maximum strength simultaneously. For example, the optimization engine can be configured to utilize a Bayesian optimization strategy to optimize the one or more formulations of the material sample based on the plurality of performance objectives. This can include performing the following actions: fitting a Gaussian Process (GP) for each performance objective of the plurality of performance objectives independently; performing Thompson sampling of the GP for each performance objective; approximating a predicted Pareto set and a predicted Pareto front for each performance objective; and outputting one or more subsequently suggested batches of material samples based on the predicted Pareto sets and the predicted Pareto fronts of the one or more batches of material samples outputted by the sample automation system.

The optimization engine can be configured to predict the plurality of performance objectives for one or more material samples not yet outputted by the sample automaton system. The optimization engine can factor in such sample(s) in determining the one or more subsequently suggested batches of material samples it outputs. In some such embodiments the optimization engine can be configured to utilize a Bayesian optimization strategy to predict the plurality of performance objectives for one or more material samples not yet outputted by the sample automation system.

The one or more subsequently suggested batches of material samples outputted by the optimization engine can be based on providing one or more subsequently suggested batches that maximizes a particular function of the material sample and/or reduces an uncertainty in a particular function of the material sample.

The system for formulating a material can also include one or more testing devices. The testing device(s) can be configured to extract data about the one or more batches of material samples outputted by the sample automation system and provide the extracted data to the optimization engine. For example, the testing device(s) can include a universal tester that is configured to perform compression testing to obtain mechanical properties of the one or more batches of material samples. The testing device(s) can be configured to compute the extracted data from a stress-strain curve of each material sample of the one or more batches of material samples.

The sample automation system can include a plurality of dispensers and one or more mixers. The dispensers can be configured to dispense a plurality of formulation primaries, and the mixer(s) can be configured to mix the plurality of formulation primaries based on a selected ratio for the plurality of formulation primaries to create at least one material sample of the plurality of material samples. The selected ratio can be based on the one or more subsequently suggested batches of material samples outputted by the optimization engine. The plurality of formulation primaries can be configured for use as three-dimensional (3D) printing ink (e.g., photo-curable ink).

The sample automation system can include a sample fabrication system. The sample fabrication system can be configured to fabricate the one or more batches of material samples. In some embodiments, the sample fabrication system can include a droplet-based 3D printer. Alternatively, or additionally, the sample fabrication system can include a stereolithography-based 3D printer, a digital light processing (DLP)-based 3D printer, and/or a direct write-based 3D printer.

The sample fabrication system can include one or more post-processors (e.g., UV light, heater). The post-processors can be configured to normalize each material sample of the one or more batches.

In some embodiments, the sample fabrication system can be semi-automated. In some other embodiments, the sample fabrication system can be fully automated.

One exemplary method of formulating a material includes dispensing a plurality of material samples and measuring data related to the plurality of material samples. The method further includes determining a suggested plurality of material samples based on the measured data related to the plurality of material samples and dispensing a subsequent plurality of material samples based on the suggested plurality of material samples.

Determining a suggested plurality of material samples can include optimizing a formulation of the plurality of material samples based on attempting to maximize each of material toughness, compression modulus, and maximum strength of the plurality of samples simultaneously, resulting in a determination of an overall Pareto front for a material to be formulated. This can include utilizing a Bayesian optimization strategy to optimize the formulation of the plurality of material samples based on the material toughness, compression modulus, and maximum strength of the plurality of material samples. For example, the utilization of the Bayesian optimization strategy can include fitting a Gaussian Process (GP) for each of the material toughness, the compression modulus, and the maximum strength of the plurality of material samples independently. It can further include performing Thompson sampling of the GP for each of the material toughness, the compression modulus, and the maximum strength of the plurality of material samples. Still further, the strategy can include approximating a predicted Pareto set and a predicted Pareto front for each of the material toughness, the compression modulus, and the maximum strength of the plurality of material samples, and outputting the suggested plurality of material samples based on the predicted Pareto sets and the predicted Pareto fronts of the plurality of material samples.

In some embodiments, determining a suggested plurality of material samples based on the measured data related to the plurality of material samples can include predicting one or more of material toughness, compression modulus, and maximum strength for one or more material samples not yet dispensed and factoring in such one or more samples not yet dispensed in outputting the suggested plurality of material samples. Predicting one or more of material toughness, compression modulus, and maximum strength for one or more material samples not yet dispensed can include using a Bayesian optimization strategy.

Measuring data related to the plurality of material samples can include performing compression testing. In at least some such embodiments, the method can further include using a stress-strain curve generated by performing compression testing to generate at least one of the material toughness, the compression modulus, or the maximum strength of the plurality of material samples.

The method can also include mixing the dispensed plurality of material samples prior to measuring data related to the plurality of material samples. In some such embodiments, the plurality of material samples can include a plurality of formulation primaries. Further, mixing the dispensed plurality of material samples prior to measuring data related to the plurality of material samples can be based on a selected ratio for the plurality of formulation primaries to create at least one material sample of the plurality of material samples. The selected ratio can be based on the suggested plurality of material samples. The plurality of formulation primaries can be configured for use as 3D printing ink (e.g., photo-curable ink).

Dispensing a plurality of material samples can include dispensing a plurality of material samples in which the samples have different properties. Determining a suggested plurality of material samples based on the measured data related to the plurality of material samples can include determining a suggested plurality of material samples in which the suggested samples have different properties.

In some embodiments that include mixing, after mixing the method can include fabricating the mixed plurality of material samples and performing one or more post-processing procedures on the mixed plurality of material samples. This can normalize each material sample of the mixed plurality of material samples, the mixed plurality of material samples being the plurality of material samples from which the data is measured.

At least one of the following actions can be performed in a semi-automated manner: dispensing a plurality of material samples, mixing the dispensed plurality of material samples prior to measuring data related to the plurality of material samples, fabricating the mixed plurality of material samples, or performing one or more post-processing procedures on the mixed plurality of material samples. Alternatively, at least one of the following actions can be performed in a fully-automated manner: dispensing a plurality of material samples, mixing the dispensed plurality of material samples prior to measuring data related to the plurality of material samples, fabricating the mixed plurality of material samples, or performing one or more post-processing procedures on the mixed plurality of material samples.

BRIEF DESCRIPTION OF THE DRAWINGS

This disclosure will be more fully understood from the following detailed description taken in conjunction with the accompanying drawings, in which.

DETAILED DESCRIPTION

Figure 1:
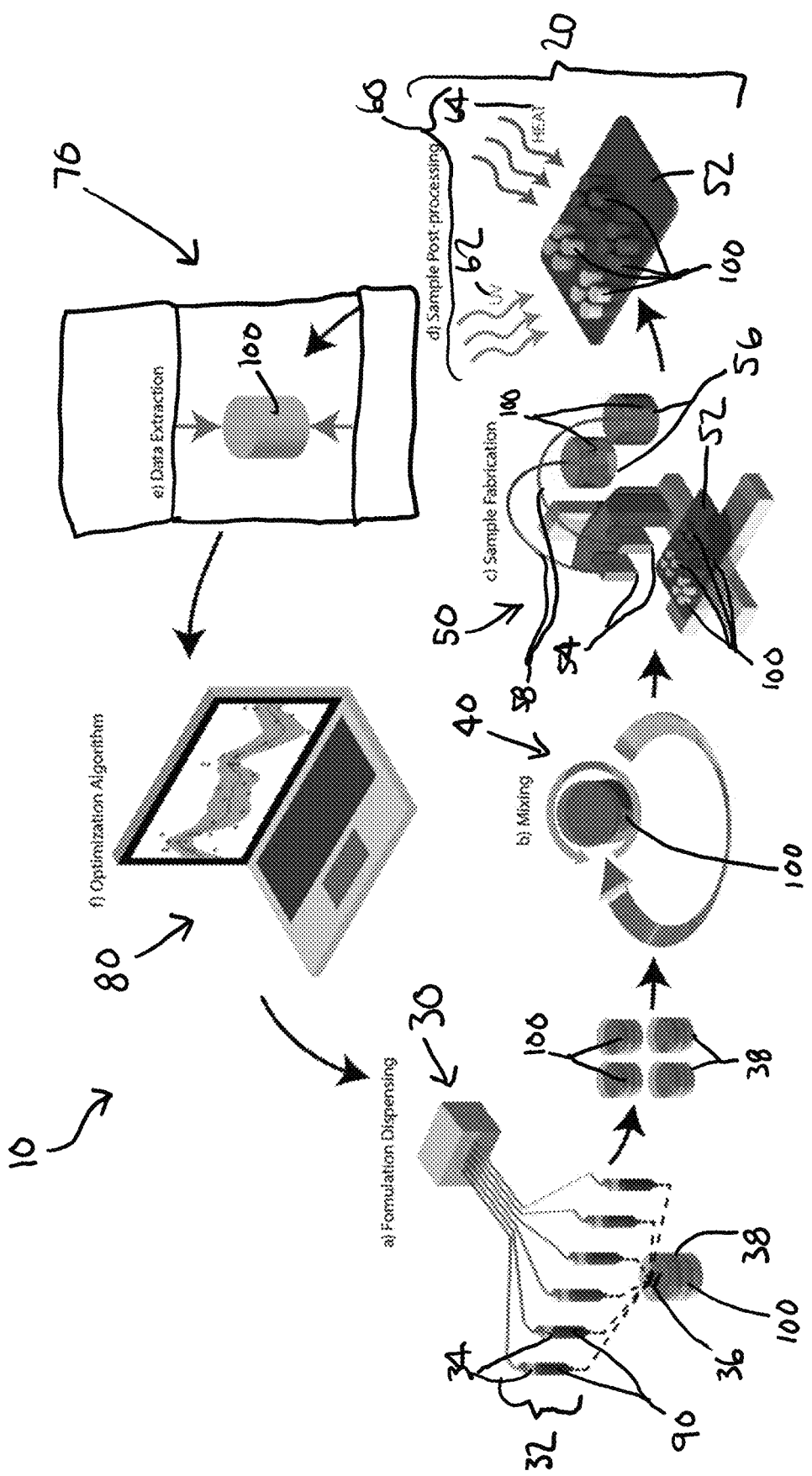
FIG. 1 is a schematic workflow of one exemplary embodiment of a system for optimizing a material formulation.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. Terms commonly known to those skilled in the art may be used interchangeably herein, such as the terms "print," "dispense," and "manufacture," and variations thereof, and additive manufacturing ("AM") and three-dimensional ("3D") printing, and variations thereof.

To the extent features, components, formulations, materials, steps, or the like are described as being "first," "second," "third," etc., such numerical ordering is generally arbitrary, and thus such numbering can be interchangeable. Further, the present disclosure includes some illustrations and descriptions that include prototypes, bench models, or schematic illustrations of set-ups. A person skilled in the art will recognize how to rely upon the present disclosure to integrate the techniques, systems, devices, and methods provided for into a product and/or production or testing method, such as a consumer-ready, factory-ready, or lab-ready material formulation system.

The systems and methods disclosed herein allow for various formulations of a material to be tested, analyzed, and subsequently adjusted in a data-driven manner. A first portion of the systems and methods relates to the equipment for dispensing the material being tested. Initial formulations are provided and then are mixed together in a desired ratio to formulate a material to be tested. As described herein, the testing can occur in batches such that, in some instances, the same ratio of formulations is used to form multiple samples having the same configuration in a single batch, while in some other instances, different ratios of formulations are used to form multiple sample configurations in a single batch. The samples can be fabricated and subjected to post-processing procedures to assist in normalizing the different samples in the same batch, and further to normalize the samples across different batches.

The fabricated samples can then be subjected to one or more testing or analysis procedures to extract relevant data from the sample regarding, for example, the mechanical performance of the respective sample. The testing apparatus(es) may or may not be considered part of the material formulation system. The testing apparatus(es) may be one or more known testing apparatuses that can perform the types of tests desired to analyze the fabricated materials. In some embodiments, one or more tests that allow for performance characteristics of the material to be analyzed such as material toughness, compression modulus, and maximum strength can be performed. By way of non-limiting example, a universal tester can be used to perform compression testing to obtain these types of mechanical performance characteristics of the formulated materials.

The data extracted by way of the test results can be delivered or otherwise presented to the second portion of the systems and methods disclosed herein—an optimization engine. The optimization engine operates an optimization algorithm designed to suggest future formulations based on the received data of the batches already fabricated, with the optimization engine or algorithm being configured to try to optimize certain properties or performance characteristics of the suggested formulated material. In at least some instances, the performance characteristics being analyzed may be at odds with each other. For example, strength and toughness are typically conflicting. In such instances, the optimization engine can be configured to produce a set of formulations resulting in optimized performance characteristics, referred to herein as a Pareto front. Still further, the optimization engine can be configured to present suggested material formulations not just based solely on the data extracted from previous samples, but based on predicted performance characteristics of not-yet-formulated materials, such predicted performance characteristics being determined based, at least in part, on the extracted data of tested samples. Iterations of the two portions—the sample automation system and the optimization system—can be continually run until an ideal set of performance characteristics—the Pareto front—is determined. The underlying formulations/mixtures of primary formulations of these materials having optimal performance are then the Pareto set.

System Overview

FIG. 1 illustrates a schematic workflow of one exemplary embodiment of a system 10, and associated methods, for deriving an optimal material formulation. As discussed herein, this can end up being a set of optimal material formulations aimed at balancing competing performance characteristics used to analyze the fabricated materials. A first subset of the system 10 includes a sample automation system 20, while a second subset of the system includes an optimization engine 80. The first subset is designed to produce samples to be analyzed and tested, while the second subset is designed to utilize the results of the sample analysis and testing to suggest one or more additional samples to analyze and test.

As shown, the sample automation system 20 can include a material dispenser 30, a mixer 40, a sample fabricator 50, and one or more tools 60 or the like for performing various post-processing techniques on the fabricated samples. In its illustrated form, it is a semi-automated sample fabrication pipeline. The illustrated components represent one exemplary embodiment of a sample automation system but are by no means limiting to what can constitute a sample automation system. Not all these components are necessary, and further, other components, or variations thereof, can be included as part of a sample automation system. By way of non-limiting example, while a mixer 40 is illustrated for purposes of combining the various ingredients and/or formulations, a person skilled in the art will appreciate other tools and techniques that can be used to combine or otherwise form the formulations involved in the fabrication of the sample materials. Further, while the illustrated embodiment provides for a semi-automated system, a completely autonomous system or fully automated system can be employed, for example by using certain robotic manipulators.

Before discussing the operation of the sample automation system 20, it can be helpful to discuss how the terminology provided for herein will be used as it relates to preparing samples to be tested and analyzed. While these terms are generally used in a particular manner in the present disclosure, it may be that a person skilled in the art uses such terms, or different terms, in a different manner than is used herein. Further, the terms may be understood to have multiple meanings in certain contexts. The foregoing notwithstanding, and with reference to FIG. 2A, generally the term ingredient is applicable to one material or element, or pre-existing or pre-formulated material. As shown, three types of ingredients 90 are provided in the illustrated embodiment: photoinitiator 92; diluents 94; and oligomers 96. Other types of ingredients also fall within the scope of the ingredients 90. One photoinitiator ingredient 92 (e.g., Bis(2,4,6-trimethylbenzoyl)-phenylphosphineoxide) is provided, three diluent ingredients 94 (e.g., acrylic acid amide, acrylic acid ester, and polyoxyethyleneamine), and four oligomer ingredients 96 (e.g., urethane-modified acrylate, aliphatic urethane di-acrylate, hexafunctional aliphatic urethane acrylate, and urethane dimethacrylate). Other types of photoinitiators, diluents, and oligomers fall within the scope of the photoinitiator 92, the diluents 94, and the oligomers 96.

Figure 2B:
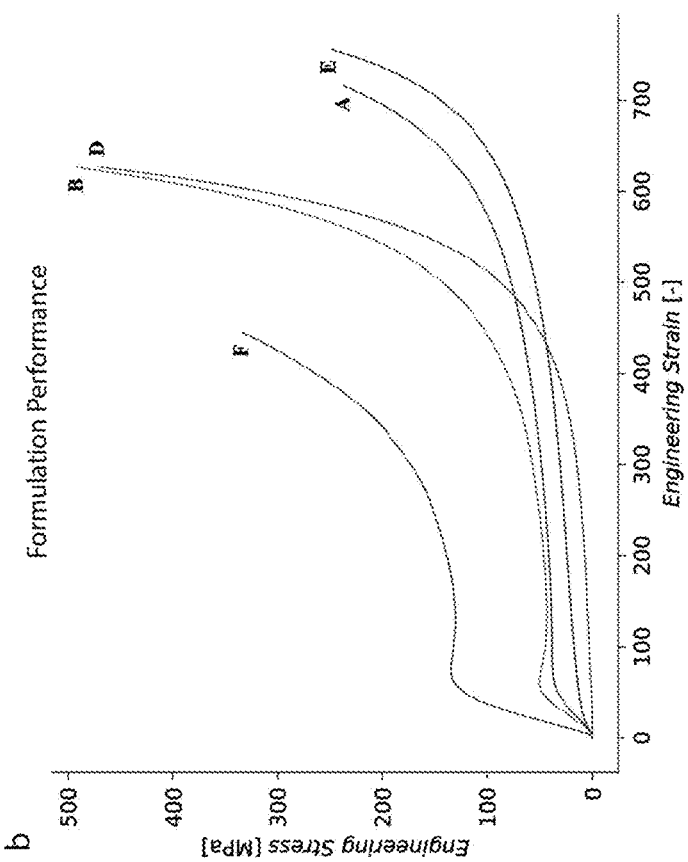
FIG. 2B is a graph illustrating performance of each of the primary formulations of FIG. 2A.
Figure 2A:
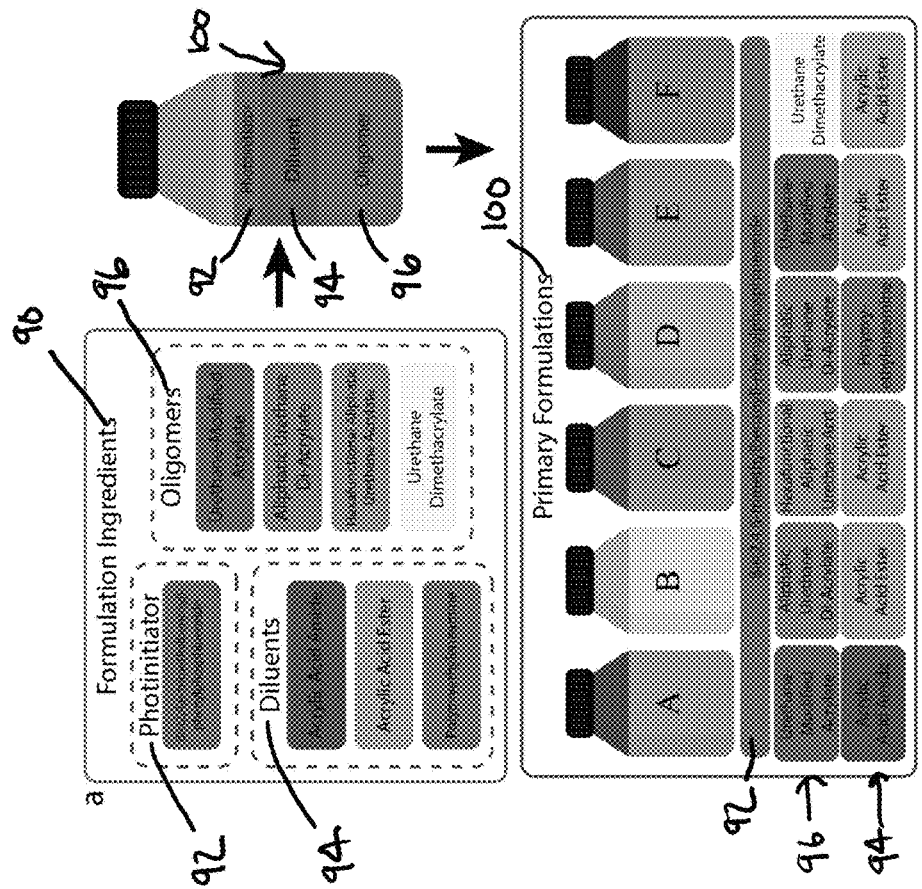
FIG. 2A is one exemplary embodiment of primary formulations used in conjunction with the system of FIG. 1.

One or more ingredients 90 can be combined to create a formulation 100, sometimes referred to herein as a material sample, although the term sample is more often used to describe the formulation 100 after it has been mixed, fabricated, and/or post-processed. As shown in FIG. 2A, one or more of each type of ingredient 90 (e.g., photoinitiator 92, diluent 94, oligomer 96) can be combined to form a variety of formulations 100. The amount of each ingredient 90 can be controlled, thereby creating a ratio of ingredients. Although in the illustrated embodiment only one type of each ingredient 90 is provided in each primary formulation A, B, C, D, E, and F (collectively, the formulations 100), in other embodiments, multiple ingredients 90 from the same ingredient type (e.g., diluent 94, oligomer 96) can be used, as can one or more other types of ingredients.

The formulations 100 are eventually fabricated and dispensed for testing purposes. As described herein, to improve efficiency, this can be done in batches, a batch including multiple samples. In some embodiments, a batch may include multiple of the same sample formulation such that multiple material samples of a single batch have the same properties, while in other embodiments a batch may include different sample formulations such that a single batch includes at least two material samples that have different properties from each other, such as one sample of each of four different formulations or two samples of each of two different formulations.

Turning back to FIG. 1, the material dispenser 30 includes a plurality of dispensing units 32 that are each configured to dispense an ingredient 90 from a chamber 34 thereof on-demand, thus performing a formulation dispensing action or step. The ingredient 90 may be a single material or element, or pre-existing or pre-formulated material. In the illustrated embodiment the dispenser 30 is a custom syringe pump-based system. The system includes stepper motors driving linear rails to compress 100 mL glass syringes that serve as the six dispensing units 32, each unit having a chamber 34 with an ingredient 90 disposed therein. Fewer or more than six dispensing units 32 and/or chambers 34 are possible. Syringe outputs can all be routed to a manifold 36 which can direct the primary formulations into a single mixing cup or formulation chamber 38. The system 30 can be controlled using an arduino with 6-axis GRBL software. This software can synchronize all the movement commands so materials can be simultaneously dispensed at varying speeds. To dispense a specific ink formulation, the displacement of each primary formulation syringe 32 can be calculated to be proportionate to the primaries contribution to the ink composition. This six-axis command can then be issued to the controller, and the initial and trailing segment of the dispense can be eliminated. Gathering only the steady state flow from the dispensing units 32 allows for differences in the surface tension and viscosity of the differing primary formulations to be circumvented.

Each dispensing unit 32 can be configured to dispense some portion of the contents of its chamber into a formulation chamber 38, creating an initial precursor formulation 100. In the illustrated embodiment, each dispensing unit 32 dispenses into the same formulation chamber 38, but in other embodiments there can be multiple formulation chambers and/or the dispensing configuration can be more intricate such that the dispensing units 32 can be configured to dispense ingredients into multiple chambers depending on the ingredient flow that is activated. Any techniques known to those skilled in the art for controlling the movement of material from one component (e.g., a dispensing unit 32) to another component (e.g., a formulation chamber 38) can be used, including but not limited to pumps, valves, and a controller and related programming and circuitry for operating the pumps, valves, and controller. Further, alternative embodiments and techniques for dispensing can be employed, including but not limited to other automated dispensers and/or manual dispensers.

As discussed in greater detail elsewhere in the present application, the ingredients 90 from each dispensing unit 32 can be dispensed in designated amounts based on, for example, an input(s) received from the optimization engine 80. Once the ingredients 90 have been dispensed in a desired ratio into the formulation chamber 38 to form the initial precursor 100, the ingredients 90 can be mixed or otherwise combined in a more uniform manner using any number of techniques known to those skilled in the art for combining ingredients. In the illustrated embodiment, the formulation chamber 38 is associated with a speed mixer 40 that mixes the formulation chamber 38, and thereby the ingredients 90 disposed therein, thus resulting in a mixing action or step. The speed mixer 40 can be, for example, a dual asymmetric centrifuge mixer. The mixing action can provide for homogenization of the ingredients 90 to formulate a a formulation 100, such as a photopolymer or ink in instances in which materials for use in 3D printing are being analyzed and formulated, thereby reducing the time and variation that may occur during the subsequent sample fabrication. In addition to other techniques beyond mixing being able to be used, in some embodiments the mixing or equivalent step can be skipped such that the material sample 100 will be based on the way the ingredients 90 naturally interact once disposed in the manner in which they are dispensed into the formulation chamber 38. In other words, the precursor is the material sample. It is noted that the reference number 100 is used to describe both the precursor (pre-mixing) and the material sample (post-mixing) because the ingredients 90 are still the same after mixing. Modifications, such as adding additional ingredients or materials to the precursor, before or after mixing, are also possible. For ease of explanation, even in those instances, the reference number 100 can still be used to refer to the resulting material sample.

The resulting formulation 100 can then be used in conjunction with a sample fabrication action or step. Similar to the mixing action, many different sample fabricators can be used without departing from the spirit of the present disclosure. In the illustrated embodiment, the sample fabricator 50 is a Jet-valve 3D printer configured to dispense each formulation or material sample 100 onto a print platform or receiving plate 52 for subsequent analysis. The printer 50 includes one or more nozzles 54 for dispensing the material samples 100 onto the print platform 52. The samples 100 are moved from a material chamber 56, through a tube 58, and through and out of a nozzle 54. The material chamber 56 can be a chamber of the printer 50 itself, the chamber 38 in which the ingredients 90 were mixed, or another chamber used to store the material sample 100 for depositing. The samples 100 can be deposited in any number of configurations, as alluded to above in the discussion regarding how batches and material samples can be deposited and organized. In the illustrated embodiment, four different material samples 100a, 100b, 100c, 100d are deposited, with each sample being deposited four times, resulting in sixteen samples in total.

After the samples 100 have been deposited, one or more post-processing actions or steps can be performed by one or more tools 60. As shown, the print platform 52 can be removed from the printer 50 and post-processing actions performed. In the illustrated embodiment, these actions are shown as including the application of ultraviolet (UV) light 62 and heat 64 to the samples to help cure them. Such application being provided by one or more tools 60 known to provide the same (e.g., a UV light, a heat lamp, etc.). The post-processing actions are intended to normalize the samples 100 across the batch(es) so that way the analysis is being done in a manner in which the only critical difference between the various formulations is the ratio of ingredients 90, and not, for example, a thickness, volume, texture, completeness of polymerization, etc. of the samples 100. While in the illustrated embodiment the print platform 52 is shown as being removed from the printer 50 for post-processing treatment, in other embodiments the post-processing can occur while the print platform 52 remains associated with the printer 50 including, for example, during printing. Additional details regarding the sample automation system 20 are provided below.

After the material samples are ready to be tested, testing can be performed to extract data regarding the samples. This can include, for example, compression testing each sample 100 by way of a universal tester 70 to extract multiple quantitative mechanical performance parameters, such as toughness, compression modulus, and/or maximum compression strength. Like the sample automation system 20, additional details regarding the testing and data extraction are provided below. The testing system may be considered or otherwise designed to be part of either the sample automation system 20 or the optimization engine 80. However, in at least some embodiments, the testing system is considered its own separate component of the system 10.

After data has been extracted from the samples 100, the data can be communicated to the second subset of the system, which includes the optimization engine 80, using techniques known to those skilled in the art for transferring or otherwise inputting data into a system, algorithm, microprocessor, etc. The optimization engine 80 includes an optimization algorithm that receives and analyzes testing results of the fabricated samples 100 and then suggests alternative sample configurations that are intended to optimize the performance of the suggested alternative sample configurations vis-à-vis the already fabricated sample configurations. As discussed in greater detail below, the algorithm can be a multi-objective optimization algorithm, such as a Bayesian optimization algorithm, for formulation and performance evaluation, from which suggestions for new formulations to test are generated by the optimization engine 80. Further, the optimization engine 80 can have the capability to predict the anticipated performance characteristics of materials not fabricated by sample automation system 20—thereby allowing for these predictions to also play a role in determining additional samples 100 to be produced and tested in an effort to determine ideal formulations of the fabricated materials. Particularly in instances where the performance characteristics are conflicting and not capable of all being independently optimized simultaneously, the determined ideal formulations are a set of formulations aimed at best optimizing (e.g., maximizing, minimizing, and/or reaching certain desired values) certain characteristics (e.g., material toughness, compression modulus, and maximum strength), referred to herein as a Pareto set.

Primary Formulations

FIG. 2A provides for one exemplary embodiment of how ingredients 90 can initially be combined to form a primary formulation 100 for testing. Any number of ingredients 90 can be used, and the ingredients 90 can be combined in any ratio. The ingredients 90 can be selected from a chemical library, and the chemical library can be curated in such a manner that it is targeted for specific uses, such as 3D printing. This helps prevent having to develop printing materials from scratch, and instead can allow materials to be selected that are diverse and commercially available, for example. As shown, the materials or ingredients 90 selected for this testing includes one photoinitiator ingredient 92, Bis(2,4,6-trimethylbenzoyl)-phenylphosphineoxide), three diluent ingredients 94, acrylic acid amide, acrylic acid ester, and polyoxyethyleneamine, and four oligomer ingredients 96, urethane-modified acrylate, aliphatic urethane di-acrylate, hexafunctional aliphatic urethane acrylate, and urethane dimethacrylate. In some instances, the oligomer 96 may be a monomer. As shown, each primary formulation 100 includes all three of a photoinitiator 92, a diluent 94, and an oligomer 96, although this does not necessarily have to be the case. More than one material from the same type of ingredient 90 (i.e., diluent, oligomer) can be selected for the same primary formulation 100, and not all ingredient types have to be selected in all primary formulations. Further, additional materials or ingredients can also be added, for example a surfactant to help reduce the surface tension, increasing compatibility with some printers, and thereby aiding in droplet formation during the printing process. In alternative embodiments, the three base materials can include rigid polyurethane, soft polyurethane, and epoxy diacrylate. In some embodiments, the ingredients 90 may be modified prior to being dispensed, for example to ensure the materials are in the same viscosity range to possibly provide for better printability and/or optimal mixing.

The oligomer or monomer 96 can be the main component of the formulation 100 (e.g., ink), transferring the majority of physical properties to the final printed sample. The reactive diluent 94 can serve to reduce the viscosity of the formulation 100 to bring it to a printable level. The diluent 94 can also factor into the final material properties, as it can become integrated into the final material structure. The photoinitiator component 92 can turn UV light into free radicals to polymerize the ingredients and/or crosslink the oligomer or monomer 96 and reactive diluent 94 together. Surfactant components can be added at least for reasons described above. Further, in setting initial parameters for the materials, and amounts to be used, requirements can be set such that the resulting formulation primaries fall within a defined printable regime, i.e., a formulation that is known to be suitable for 3D printing.

In one non-limiting instance, the inks illustrated in FIG. 2A were mixed as follows:

TABLE 1

| Composition | Monomer | Diluent | Photoinitiator | Surfactant |
| --- | --- | --- | --- | --- |
| A | 60% Urethane-Modified Acrylate | 40% Acrylic Acid Amide | 0.5% Bis(2,4,6-trimethylbenzoyl)-phenylphosphineoxide | 1% Tween-20 |
| B | 70% Aliphatic Urethane Di-Acrylate | 30% Acrylic Acid Ester | 0.5% Bis(2,4,6-trimethylbenzoyl)-phenylphosphineoxide | 0.5% Tween-20 |
| C | 70% Hexafunctional Aliphatic Urethane Acrylate | 30% Acrylic Acid Ester | 0.5% Bis(2,4,6-trimethylbenzoyl)-phenylphosphineoxide | 0.5% Tween-20 |
| D | 70% Aliphatic Urethane Di-Acrylate | 30% Polyoxyethyleneamine | 0.5% Bis(2,4,6-trimethylbenzoyl)-phenylphosphineoxide | 0.5% Tween-20 |
| E | 60% Urethane-Modified Acrylate | 40% Acrylic Acid Ester | 0.5% Bis(2,4,6-trimethylbenzoyl)-phenylphosphineoxide | 0.5% Tween-20 |
| F | 90% Urethane Dimethacrylate | 10% Acrylic Acid Ester | 0.5% Bis(2,4,6-trimethylbenzoyl)-phenylphosphineoxide | |

As shown, the photoinitiator 92 is set at a constant across all formulation primaries A, B, C, D, E, F (collectively, the formulations 100) to avoid its influence on sample performance. In general, primary formulations 100 can be pre-selected for their ease of printability and uniqueness of mechanical properties and chemical composition compared to others in an initial screening set. FIG. 2B illustrates the stress-strain performance of each of the primary formulations A, B, C, D, E, F individually. As shown, the different illustrated curves for each primary formulation A, B, C, D, E, F demonstrate that the primary formulations lead to cured materials with strongly varying mechanical properties. Mixing of the different primary formulations can lead to formulations that can be processed into material samples with new and/or different mechanical properties.

The primary formulations 100 can be subsequently mixed using any number of mixing systems, non-limiting embodiments of which are described above with respect to FIG. 1. As discussed above, in some embodiments, a SpeedMixer (FlackTek, Landrum, S.C., USA) can be utilized to mix the ingredients 90 together. This instrument 40 includes a dual axis centrifuge, causing materials within the mixing vessel to flow into themselves, rapidly mixing them together. This reduces the overall mixing time to about three (3) minutes at about 3000 rpm for base compositions, and about 45 seconds at about 3000 rpm for final ink compositions, greatly increasing throughput. In other embodiments, continuous inline mixers can be utilized to assist in creating a homogeneous formulation.

Alternatively, mixing can be done in a more traditional, longer fashion. For example, the initial formulations may be heated to about 60° C. to help reduce the viscosity of the oligomer or monomer. A stir bar can then be used to mix base compositions, which can take approximately 15 minutes, and another approximately five (5) minutes to mix together final ink compositions as they begin at a closer viscosity range. Added on top of these mixing times can be about 10 minutes of heating to bring the components to about 60° C. before mixing.

Figure 3:
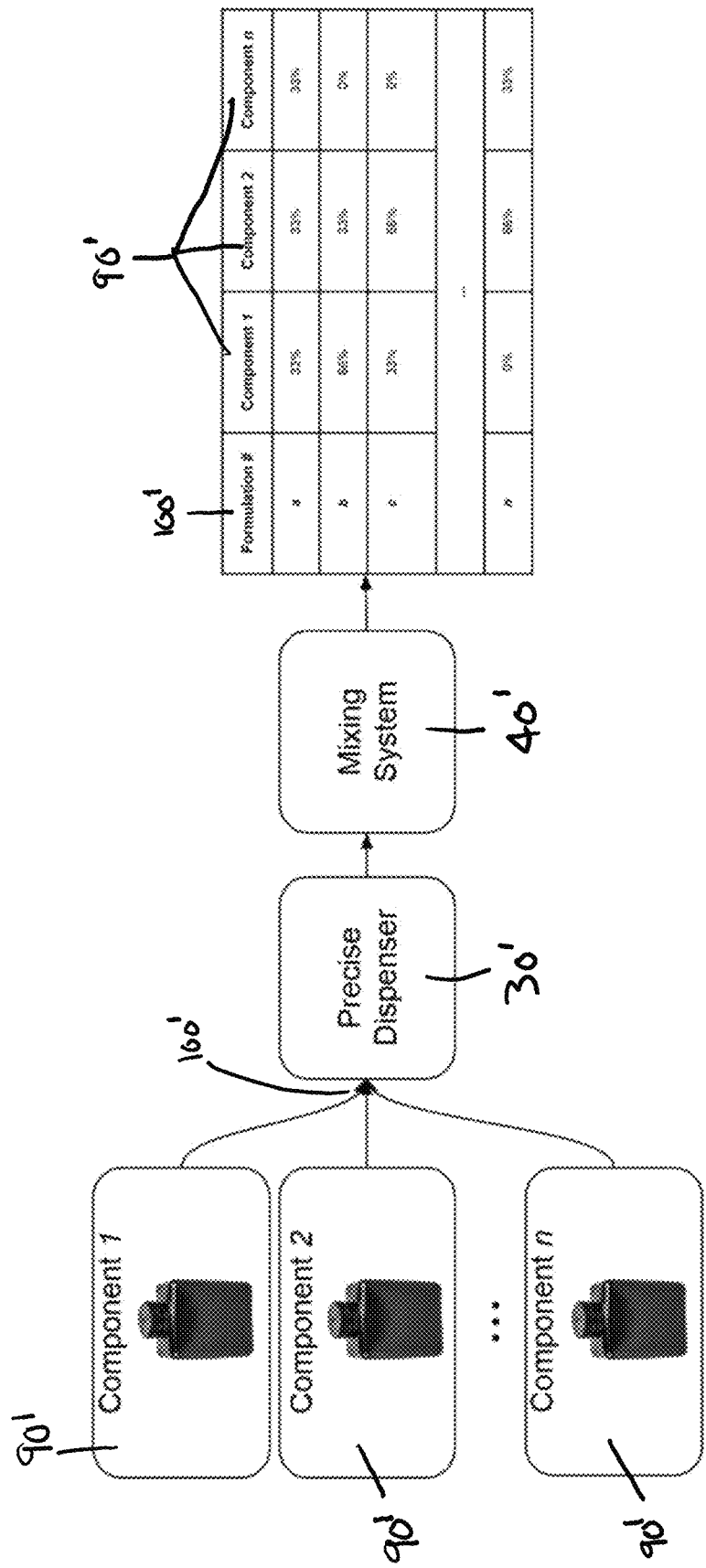
FIG. 3 is a schematic illustration of a material creation system that can be used in conjunction with a system like the system of FIG. 1.

FIG. 3 illustrates a more generic illustration of this portion of a sample automation system. As shown, any number of ingredients or components 90' can be provided, as indicated by labeling of n number of components. The ingredients 90' can be in fluid communication with a dispenser 30' to create an initial formulation 100', which is subsequently mixed by any type of mixing system 40'. As illustrated in the table at the end of the flowchart, each formulation a, b, c, n can have its own ratio of components/ingredients 90'.

As will become more apparent based on discussions of the testing and optimization algorithm, in some instances testing can help derive useful design constraints on the possible formulations. For example, with respect to the ingredients 90 of FIG. 2A, during preliminary testing, it was noticed that formulations with high degrees of primary C, which included hexafunctional aliphatic urethane acrylate and acrylic acid ester, were too brittle to be flattened. As a result, constraints on the formulation design were able to be implemented, including in real-time. These constraints, also identified in FIG. 6A, were: (1) a, b, d, e, f $\in$ [0,1]; (2) c $\in$ [0,0.5]; (3) a+b+c+d+e+f=1, where a, b, c, d, e, and f refer to the amounts of each of six primaries, scaled to be between 0 and 1 in the ratio of the sample weight.

Sample Fabrication and Post-Processing

Figure 4:
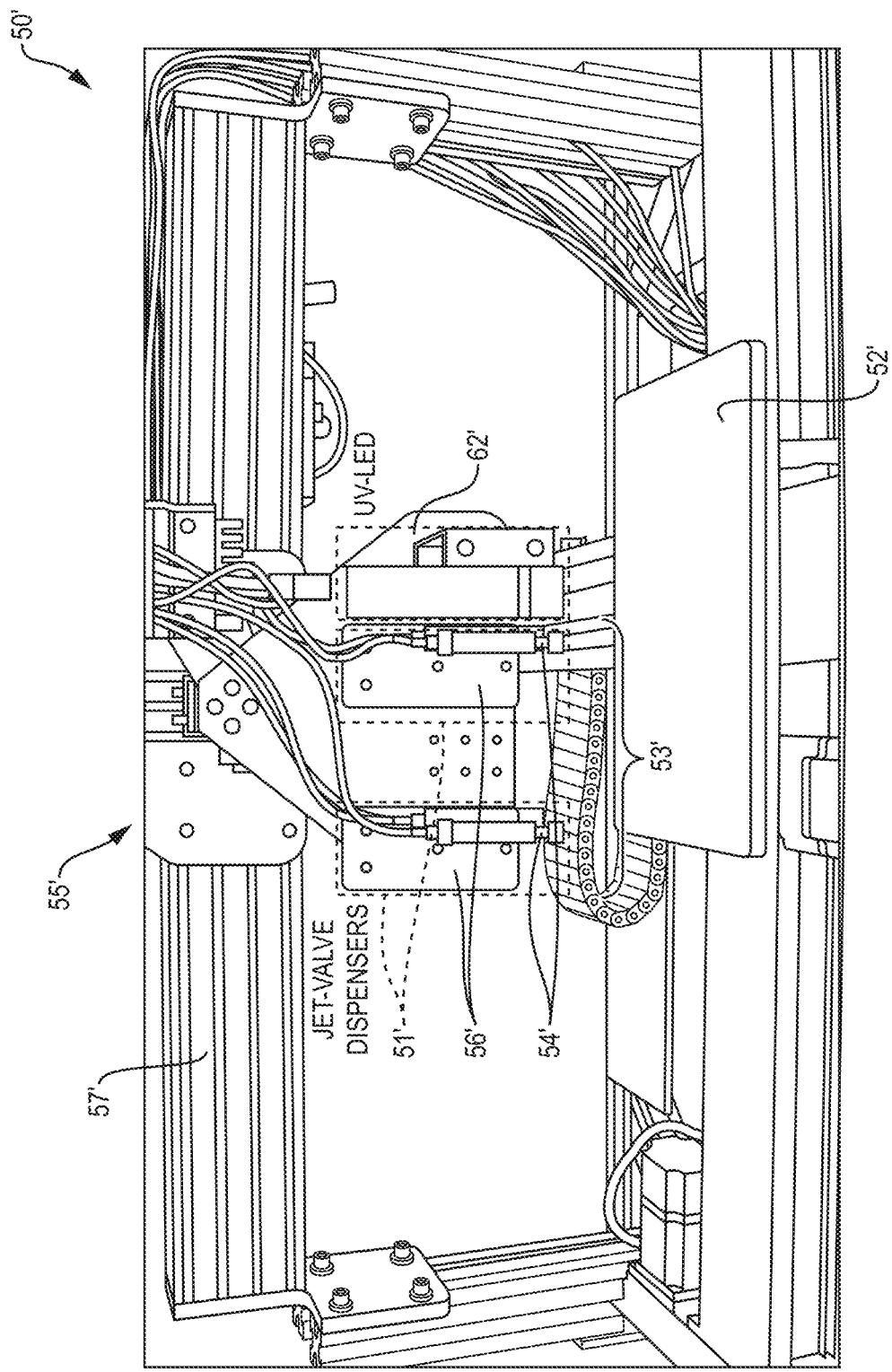
FIG. 4 is one exemplary embodiment of a sample automation system that can be used in conjunction with a system like the system of FIG. 1.

One exemplary embodiment of a sample fabricator 50' is illustrated in FIG. 4. The sample fabricator 50' is a bench model designed for purposes of testing the systems and methods described herein. More particularly, the fabricator 50' includes a hardware set-up based on piezo-actuated jet-valves. The jetting head includes dispensers 51' having a nozzle 54' with a diameter of about 300 microns, a spring-loaded needle valve, a pressurized ink reservoir or chamber 56', a valve body, and a piezoelectric actuator. Although the spring-loaded needle valve, valve body, and piezoelectric actuator are not labeled, a person skilled in the art will recognize where they are or can be located. To create a droplet, first the piezoelectric actuator releases the force holding the needle valve in the closed position. The spring forces the needle valve into its open state. A pressurized ingredient, e.g., ink 100', is forced through an opening of the nozzle 54', thereby dispensing fluid. Finally, the piezoelectric actuator closes the needle valve into the closed position, cutting off the flow of ink 100'. The amount of material that is dispensed is a function of at least the opening time of the nozzle 54', the back pressure of the ink 100', and/or the fluid properties of the ink 100'.

The use of the jet-valve 3D printer 50' as the sample fabricator increases the variety of inks that can be printed and reduces the printing set up time. When compared to other types of 3D printing techniques, jet-valve can generally dispense inks with a larger variety of fluid properties (such as viscosity). Furthermore, jet-valve dispensing typically requires significantly less tuning of process parameters to attain reliable printing. These traits can thus increase ink variety that can be tested and reduce the processing time of the experimental data collection.

More particularly, the illustrated jet-valve 3D printer 50' includes a printhead(s) 53' having two jet-valve dispensers 51' (PICO Pμlse® from Nordson EFD, Providence, R.I., USA), a UV LED 62' (Phoseon Technology, Hillsboro, Oreg., USA), a Cartesian robot 55' (Hiwin Microsystems, Taichung, Taiwan), a gantry 57', a build or print platform 52', and a controller (not shown). The jet-valve dispensers 51' can be used to dispense two materials 100' in parallel. The UV LED 62' can be used to cure the ink 100' after it is dispensed by the dispensers 51', thus providing for post-processing directly in the fabricator 50'. The Cartesian robot 55' can be utilized to change the position of the jet-valve dispensers 51' and/or UV LED 62' with respect to the build platform 52'. The movement of the Cartesian robot 55' and the actuation of the dispensers 51' and UV LED 62' can be controlled by a g-code file that is interpreted by the controller, among other techniques known to those skilled in the art.

More particularly, the controller can utilize the same g-code file for each formulation 100. To create a layer of the 3D printed sample, the dispenser(s) 51' can follow a vector path and deposit droplets of ink 100' to create a continuous line of material. It can follow a vector path described in g-code until an entire layer of material is deposited for example. After the layer is finished, the UV LED 62' can be turned on and can raster over the entire deposited layer to cure the ink 100', transforming the ink 100' into polymeric materials. After curing, the dispensers 51' and UV LED 62' can be incremented upwards by the thickness of one layer and the process can be repeated until the prescribed 3D object, e.g., sample 100' to be tested, has been dispensed. After processing, each material sample 100 can be considered a base polymer.

G-code instructions can be generated using slicing software (Slic3r), which can generate printing instructions for a fused deposition modeling process. This code can then be post-processed further to insert UV LED steps at the end of layers, and change dispensing instructions to communicate properly with the jet-valve dispensers 51', among other commands derivable in view of the present disclosures by a person skilled in the art (e.g., movement of the various components of the printer 50' to position the dispensers and/or the build platform 52' with respect to each other. The slicing software can be imported with four 8 mm by 8 mm cylinders in a grid array, for instance, with droplet spacing being selected to ensure no voids are present between droplets.

While the overall g-code print instructions can remain constant for all samples, parameters on the print head controller may be adjusted to ensure printability and consistency in droplet size across ink formulations 100'. For example, temperature of the printhead 53' can be kept at a steady approximately 60° C. for all print, and the close voltage of the valve can also be kept at the maximum possible value. Values for syringe pressure, valve opening percentage, and/or valve opening time can be adjusted per print to normalize the mass of an individual droplet. Changing these dispensing parameters, among others, can result in changes in droplet diameter. As valve opening percentage, syringe pressure, and/or valve opening time increases, the size of the droplet increases. These parameters are generally over a threshold that ensures a droplet is jetted properly. If jetting parameters are set too high, splashing can occur when the ink 100' hits a build platform 52', which in at least some instances can be a substrate.

Due to the layer-by-layer fashion of 3D printing, several features can be introduced during the processing, such as layer to layer adhesion, that can affect the resulting mechanical properties of the printed material 100'. Hence, testing new formulations 100' after 3D printing ensures that processes affecting mechanical performance are included in the optimization. Further, after the set of ink formulations 100' are printed into geometric samples, post-processing, such as UV curing and heating, can be conducted to reduce unnecessary variations. More particularly, to ensure consistency across printed samples with different formulations, one or more post-curing steps after printing can be performed by one or more tools to assist in completing the polymerization process. This can account for any reaction rate-based differences in the printing process due to differing ink compositions, which can be accounted for in printing process optimization. For example, approximately one hour of baking at approximately 60° C. and flooding in approximately 365 nm/405 nm UV light in a post-curing oven (Wicked Engineering, East Windsor, Conn., USA) can help to complete polymerization. Further, to remove variations in the height of the compression samples caused by printing and post-processing, the samples can be flattened or have other geometric adjustments made to the samples with one or more machining processes. A person skilled in the art, in view of the present disclosures, will understand other types of post-processing events that can be performed without departing from the spirit of the present disclosure. Further, post-processing is not a necessary requirement of the process. In some embodiments the sample fabrication can be done in a manner where normalization of the samples is unnecessary and/or the optimization engine 80 can be configured to account for samples that are not normalized by way of post-processing.

While the illustrated embodiment uses a jet-valve 3D printer 50', other types of droplet-based 3D printers can be utilized without departing from the spirit of the present disclosure. Likewise, other types of 3D printers or other fabrication instruments or systems can be utilized to perform the sample fabrication action without departing from the spirit of the present disclosure. Other 3D printing options that can be implemented and used in the context of the present disclosures includes but is not limited to stereolithography, digital light processing (DLP), and direct write 3D printing systems and methods.

Sample Testing and Data Extraction

A variety of different testing can be performed to extract or measure data from the fabricated samples. By way of non-limiting example, compression testing can be performed using a universal tester 70 (FIG. 1) to extract the desired performance data from each sample 100. As discussed above, more than one of the same sample configurations can be tested at the same time, for example samples can be tested in quadruplicate to identify outlier data and/or run the testing more quickly. Mechanical properties can then be computed based on the test results. For example, for compression testing, mechanical properties such as toughness, compression modulus, and compression strength can be computed from the stress-strain curve that results from the compression testing. Where multiple samples are tested, the results can be averaged and/or outliers can be eliminated as is known by those skilled in the art of data analysis.

Compression testing allows for the precision positioning step required in other types of testing, such as tensile testing, to be removed, thereby reducing testing time. Additionally sample size can be shrunk in compression testing, for example to about 8 mm in diameter, with an overall volume of approximately 400 mm$^3$. This allows for more samples to be printed on each print platform (e.g., the platform 52), reducing printing time and significantly reducing the amount of raw materials to complete optimization.

In some exemplary embodiments, compression testing can be completed on a Shimadzu AGS-100 kNX universal tester and/or an Instron 5984 universal tester. Multiple compression rates can be tested on these instruments, finding a maximum compression rate of approximately 12 mm per minute while maintaining consistency in testing data. In addition to optimizing the rate of compression, a machining step can be added to the process to remove inconsistencies in the top of the printed samples. These inconsistencies may arise from differences in surface tensions between inks, resulting in differing degrees of doming between prints. By roughly machining the printed samples while still attached to the print platform, consistent surfaces on the top and bottom can be achieved in an automation friendly format in under approximately two (2) minutes per composition. These samples can then be measured in both diameter and height via a caliper to account for dimensional differences.

While compression testing provides for one exemplary testing method, other testing methods can also be implemented, including but not limited to tensile testing and nanoindentation testing. By way of one non-limiting example, ASTMD-638 standard can be used for measuring properties such as maximum toughness, modulus, and maximum stress or strength. The smallest possible dogbone (standard V) allowed in the documentation can be utilized, which can thus provide for a dogbone of approximately 63.5 mm by approximately 9.5 mm, and an overall volume of approximately 1580 $mm^3$. While useful for initial testing, these samples require precise positioning in a universal testing system (e.g., Instron 68SC-1) taking approximately three (3) minutes per replicate, and approximately 12 minutes per sample to complete testing.

Optimization Engine and Algorithm

With six variables that can take real values between 0 and 1 with 2 decimals, the design space includes 1,609,344,100 different formulations. Randomly or intuitively sampling the design space may take months or years to gain enough knowledge of the performance of the samples and uncover optimal regions of the space. To make the optimization more time- and cost-efficient, the optimization engine 80 utilizes a data-driven approach. The approach learns to predict the performance of untested samples and guides the sampling of the design space to quickly find better performing designs. More specifically, the optimization engine 80 follows a Bayesian optimization strategy that has proven effective for applications with black-box objective functions and a limited budget of tested samples. More particularly, the strategy implemented in the present disclosures solves a multi-objective Bayesian optimization problem, to wit, performing three competing optimizations in a single multi-objective optimization simultaneously.

Figure 5:
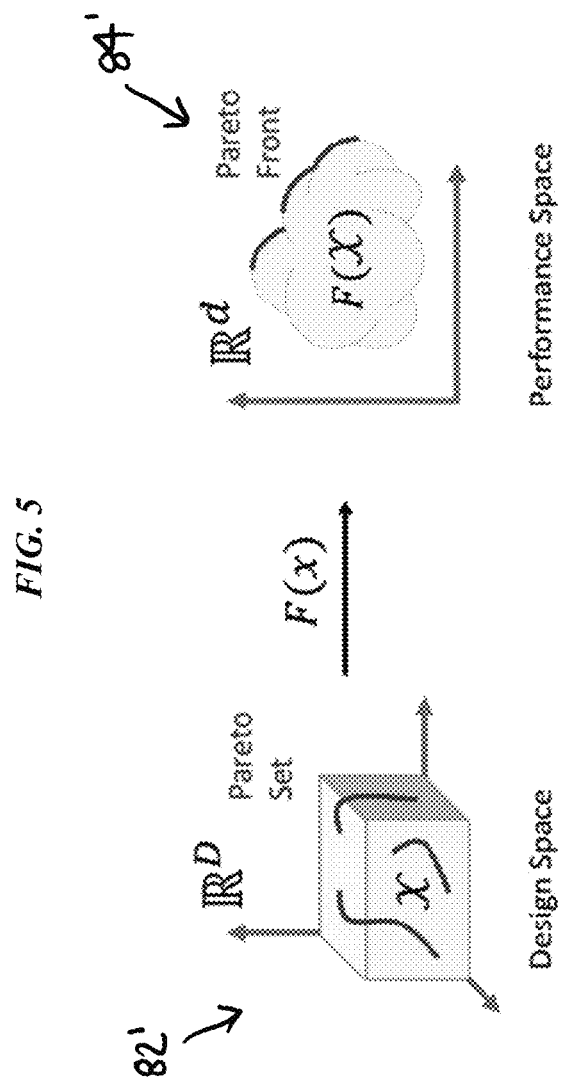
FIG. 5 is a schematic illustration of a Pareto Set and a Pareto Front.

The performance objectives utilized by the algorithm of the optimization engine 80 are maximizing compression modulus, toughness, and compression strength. These materials can be important for designing and selecting structural materials in engineering applications. Typically, all three of these material properties need to be maximized for many engineering applications. However, these objectives can often be conflicting, and there is no single optimal solution, but rather a set of best performing designs with different trade-offs. Depending on the application, the higher performance of one of these properties can be more important than others. As illustrated in FIG. 5, and discussed above, the set of solutions is formally called Pareto set 82, and their corresponding values in the performance space are called Pareto front 84. A point is Pareto optimal if there is no other point that dominates it in all objectives. The optimization engine 80 is configured to discover the best (e.g., largest, where size is measured by hypervolume, as described in greater detail below) possible Pareto front 84. The quality of the Pareto front 84 is measured with a hypervolume indicator, i.e., a volume of the dominated region of the performance space. A person skilled in the art will recognize that other performance objectives can be used in addition to, or in lieu of, one or more of the three objectives identified herein. While in the present embodiment the Pareto set is six-dimensional and has the same dimensions as the Pareto front, in other embodiments there may be a different number of dimensions and/or the number of dimensions of the Pareto set does not have to match the number of dimensions of the Pareto front. The set of 30 initial samples is generated to uniformly cover the design. The uniformly distributed points on the standard simplex are determined by generating a random vector of five values from the symmetric Dirichlet distribution.

While in the present disclosure the performance objectives under consideration relate to mechanical properties, the present disclosure is by no means limited to evaluating samples solely, or even partly, on mechanical properties. The performance objectives can include other performance objectives of interest, including but not limited to optical properties, electrical properties, chemical properties, other mechanical properties not explicitly or implicitly provided for herein, cost (e.g., material cost), and usability, among others. A person skilled in the art, in view of the present disclosures, will understand that relevant properties for determining the same can be generated by using different types of testing equipment and/or computing the properties from known information about relevant design parameters (e.g., for calculating a performance objective like cost). Further, the design space can include chemical formulations, but can also include process or design parameters, such as curing time, jetting parameters, and other parameters of the sample automation system 20. In some embodiments, the design parameters can be optimized during the optimization process. A person skilled in the art will recognize that any of components or actions performed in conjunction with the system 10 can be optimized and/or adjusted in view of the present disclosures.

Figures 6A, 6B, 6C:
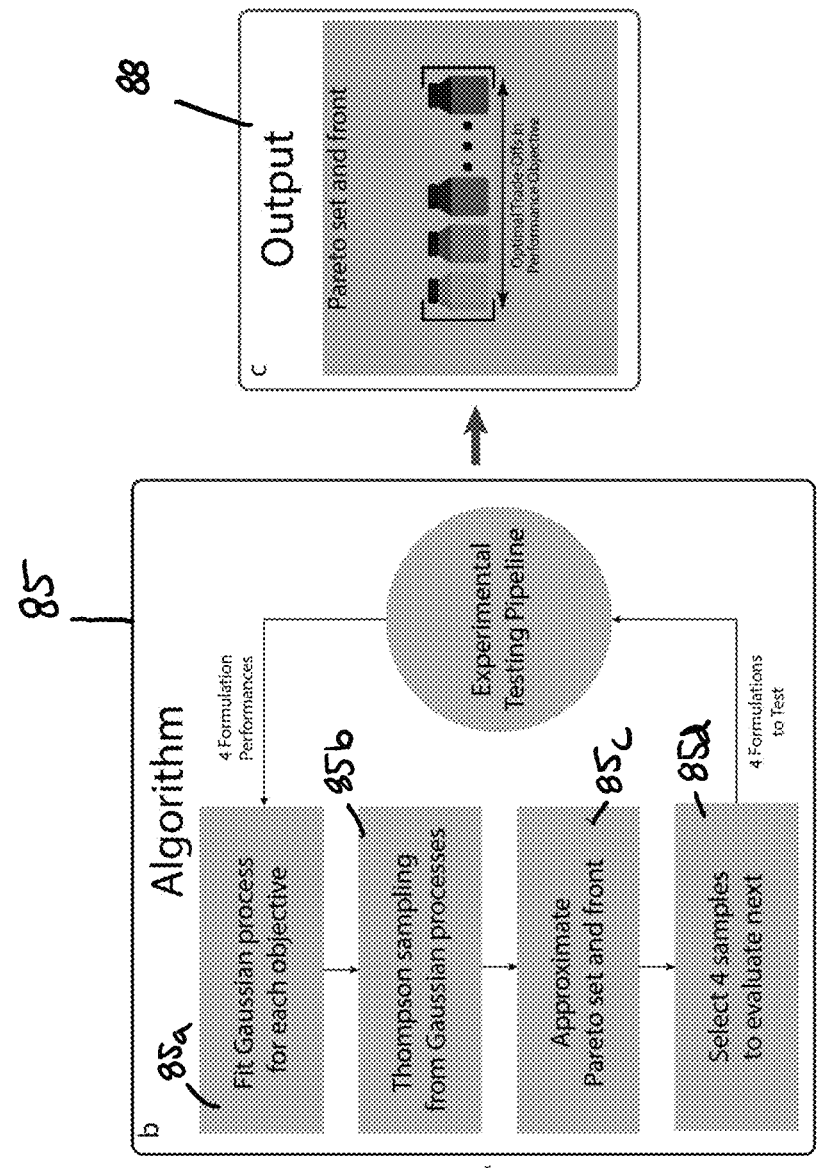
FIG. 6A is a schematic illustration of exemplary data related to primary formulations that can be inputted into an optimization engine of a system like the system of FIG. 1.
FIG. 6B is a schematic illustration of an algorithm operated by an optimization engine of a system like the system of FIG. 1, the optimization engine being able to receive the data of FIG. 6A.
FIG. 6C is a schematic illustration of an exemplary output of the optimization engine of FIG. 6B.

Turning to FIGS. 6A-6C, the optimization algorithm 85, including its possible inputs 86, its iterative process, and its eventual outputs 88, are provided. FIG. 6A illustrates the information that is inputted into the algorithm 85. This includes: (1) the design space variables, e.g., the primary formulations A-F as shown; (2) the design space constraints, which can be derived from testing or otherwise known or determined for a sample optimization being performed; (3) performance objectives selections, e.g., maximizing compression modulus, toughness, and compression strength; and (4) an initial set of samples 101 (i.e., formulations) from which the design space variables are formed. In one embodiment, the initial set of samples 101 was 30 randomly generated samples aimed at covering the design space as uniformly as possible.

Mechanical performance data was first transformed into engineering stress by dividing the measured force by the surface area of the sample. Engineering strain can be normalized by dividing the displacement of the tester by the original height of the sample. Once converted to engineering values, the stress-strain data can be trimmed, allowing for excess data in the initial loading cycle of the tester to be removed along with data after the failure point of the sample. The initial loading segment can be trimmed via careful monitoring of the slope of the stress-strain data, looking for the slope to increase to at least 0.1. All data prior to this point can be discarded as noise in initial loading. To find the failure point, the second derivative of the engineering data can be rank ordered and filtered for points with at least three consecutive negative slopes following. Additional filtering on this list of potential failure points can be applied removing points that occurred within the first 30% of the data series.

Figure 7A:
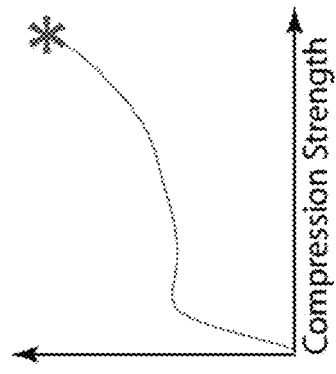
FIGS. 7A-7C are schematic illustrations of three performance objectives that can be optimized by the algorithm of FIG. 6B.
Figure 7B:
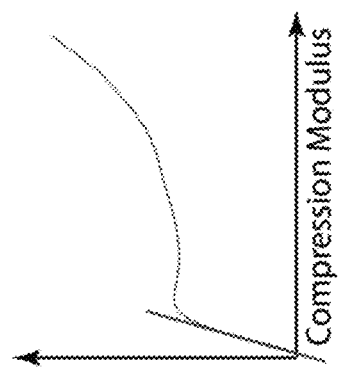
Figure 7C:
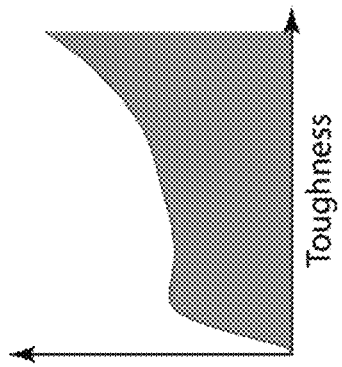

Once the initial data was preprocessed, transformation into performance parameters can occur as shown in FIGS. 7A-7C. More particularly, FIGS. 7A-7C represent visual depictions of how the mechanical properties from the stress-strain curve can be calculated. The modulus can be determined by calculating a linear fit on the engineering stress-strain data for all points below 100 MPa with a sliding window of 20 data points. The median modulus can then be calculated from these values and a filter for all moduli within 60% of the median can be applied. Using the values within 60% deviation from the median, a final linear fit can be applied across the entire range and classified as the modulus for the sample. The maximal values for both engineering stress and strain can be taken from the trimmed data and used for performance values.

In this specific, non-limiting example, the design space is six-dimensional, where parameters can take real values from 0 to 1. To simplify the fabrication, the parameters can be limited to values with two decimals. In that case, each of the six parameters can take 101 different values. Furthermore, these parameters sum up to 1. All valid combinations of these parameters then lie on a standard five-simplex, a five-dimensional polytope that is a convex hull of its six vertices. The number of points on a discrete simplex can be calculated as $(N+n-1)/n$, where $N+1$ is the number of different values that each parameter can take, and $n$ is the number of parameters. In this embodiment, the total number of points on this simplex is $(100+6-1)/6=1,609,344,100$. Testing four samples per day would lead to 402,336,025 days of testing if all points were to be evaluated.

Figure 8:
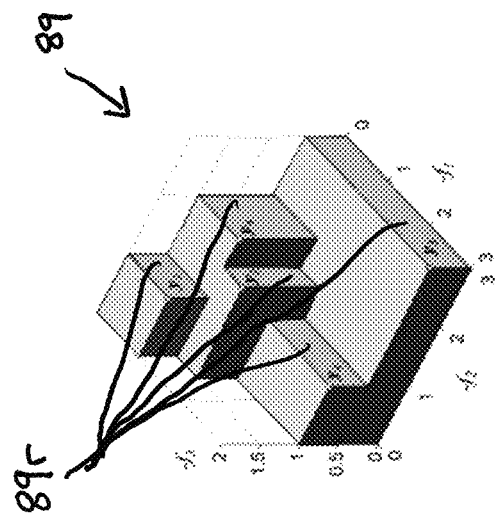
FIG. 8 is a schematic hypervolume that is a resultant of optimal points of primary formulations.

FIG. 8 illustrates a hypervolume 89 that is resultant of optimal points y1, y2, y3, y4, and y5, the hypervolumes being the five rectangles 89r in which in which the optimal points are disposed. It is a visual depiction to help understand hypervolume, with the present instance including five formulation performances that are plotted in the performance space. The hypervolume can be used as a measure of the algorithm to determine whether improvements of the Pareto front (i.e., improvements to the mechanical performance characteristics) have been achieved. IT an be used as one of several possible criteria to determine if the next iteration should be started or if no further improvements are to be expected.

The optimization algorithm 85 itself is illustrated in FIG. 6B, and it is an iterative process. It is a Bayesian optimization algorithm. The first part 85a of the algorithm 85 fits a Gaussian Process (GP) for each objective independently. Thus, where three performance objectives are being optimized (e.g., material toughness, compression modulus, strength), a stochastic process is utilized for each objective, the data associated with the same being updated based on each iteration of the algorithm. The GPs can be trained on the evaluated data points and can be used as a surrogate model for black-box objective functions. More particularly, in each iteration of the algorithm, a GP can be fitted for each objective independently. To train the hyperparameters of GP, the maximum a posteriori estimate can be used. In one exemplary embodiment, a Matern kernel 5/2 can be used, as it can support the most general and complex function types. The GP predicts the material characteristics of the whole design space. During the optimization the GP can be fitted to all the data generated from the experimental testing pipeline. The GP allows the prediction of material characteristics for not-yet produced and tested materials. The predicted values can be given with an uncertainty of the prediction. As additional iterations of the algorithm 85 are performed, the uncertainty of individual parts of the performance space can be reduced.

Thompson sampling of the GPs can then be used to balance the trade-offs of exploiting the best performing regions and exploring unseen regions of the design space in a second part 85b of the algorithm 85. This action provides a heuristic for choosing actions, i.e., selecting a next sample(s) to be dispensed and tested while attempting to maximize the performance objectives in view of the data already received by the optimization engine 80. A person skilled in the art, in view of the present disclosures, will understand how to program GPs and Thompson sampling in view of the desired performance objectives being optimized.

A third part 85c of the algorithm 85 can solve a multi-objective optimization problem on the previously sampled functions. This part can extract a predicted Pareto front and Pareto set for each performance objective. More particularly, to solve the multi-objective optimization problem on objective functions extracted with Thompson sampling from GPs, a standard NSGA-II solver can be used. Additional details about such an NSGA-II solver is provided for in an article entitled "A fast and elitist multiobjective genetic algorithm: NSGA-II," by Deb, K., Pratap, A., Agarwal, S., and Meyarivan, T., published in IEEE Transactions on Evolutionary Computation, vol. 6, no. 2, pp. 182-197 in April 2002, doi: 10.1109/4235.996017, the contents of which is incorporated by reference herein in its entirety. In each iteration, a population size of 100, and a total number of 100 generations, can be used. Handling the linear equality constraint $a+b+c+d+e+f=1$ can be done by adding two inequality constraints to the solver, $a+b+c+d+e+f-1\geq 0$ and $a+b+c+d+e+f-1\leq 0$, making sure that mutation points that do not satisfy these constraints are not proposed. To monitor the hypervolume improvement over iterations, a fixed reference point [1.361656338114889e+02, 0.037819494001910, 2.226856385006103e+04] can be used throughout. This point is noted to have minimal value for each of the three objectives of evaluated points in the initial dataset. Additional details at least about the use of a GP and Thompson sampling is provided for in an article entitled "Efficient multiobjective optimization employing gaussian processes, spectral sampling and a genetic algorithm," by Bradford, E., Schweidtmann, A., and Lapkin, A., published in *Journal of Global Optimization*, 71(2):407-438 in 2018, the contents of which is incorporated by reference herein in its entirety.

A fourth part 85d of the algorithm 85 can propose which samples to evaluate in a next iteration. This can include a ratio of ingredients 90 to be dispensed for a next sample(s) 100 to be tested. Alternatively, or additionally, this can include providing instructions as it relates to how the ingredients 90 are mixed or otherwise homogenized prior to sample fabrication, how they samples 100 are fabricated or printed, and/or the post-processing that is applied to the printed samples 100. To further reduce the optimization time, a batch of multiple samples 100 (e.g., four) can be evaluated in parallel, and thus multiple samples 100 can be generated as the next samples 100 to be evaluated. The samples 100 chosen with mechanical characteristics from the predicted Pareto front can be the ones with the largest expected hypervolume improvement. Those samples 100 can then be created by the sample automation system 20, identified in the diagram as the experimental testing pipeline, and the optimization engine 80 can be run to evaluate the newly produced samples 100. The newly evaluated samples 100 can be added to the currently available dataset and iterate through the algorithm 85. The one or more subsequently suggested batches of material samples outputted by the optimization engine 80 can be based on providing one or more subsequently suggested batches that at least one of optimizes (e.g., maximizes, minimizes, or reaches a certain value) a particular function of the material sample or reduces an uncertainty in a particular function of the material sample design space. Eventually, the algorithm 85 can be configured to output a final Pareto set and front 88, illustrated by FIG. 6C, illustrating the optimal trade-offs in performance objectives amongst the derived formulations. When that output will occur can be set by an operator of the system 10, and can be based on a variety of parameters, including but not limited to the number of samples desired to be run, achieving a particular performance parameter, or setting a number of iterations to run, among other parameters. This output 88 is not necessarily a final output as additional iterations of the algorithm 85 can be run and/or other inputs 86 can be provided to further update the outputted Pareto set and front 88.

Results

As discussed above, the algorithm 85 can be set to produce the output 88, i.e., the Pareto set and front, at any desired point in time. That is, any number of samples 100 can be run before deriving the output 88. In one embodiment, 30 algorithm iterations were run in view of wanting to analyze 120 samples in addition to the additional data set. In that embodiment, after testing 152 samples, the system 10 was able to identify a set of 12 formulations that had optimal trade-offs in the three mechanical properties of compression modulus, maximum compression strength, and toughness, as shown in FIGS. 9A-9E. The Pareto set 88 includes formulations that increase the maximum compression strength by approximately 70.8% and toughness by approximately 50.8% over the performance of the initial six primary formulations.

Figure 9B:
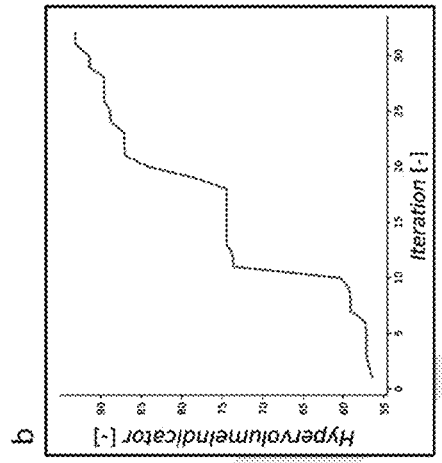
FIG. 9B is hypervolume improvement plot associated with the results of FIG. 9A.
Figure 9A:
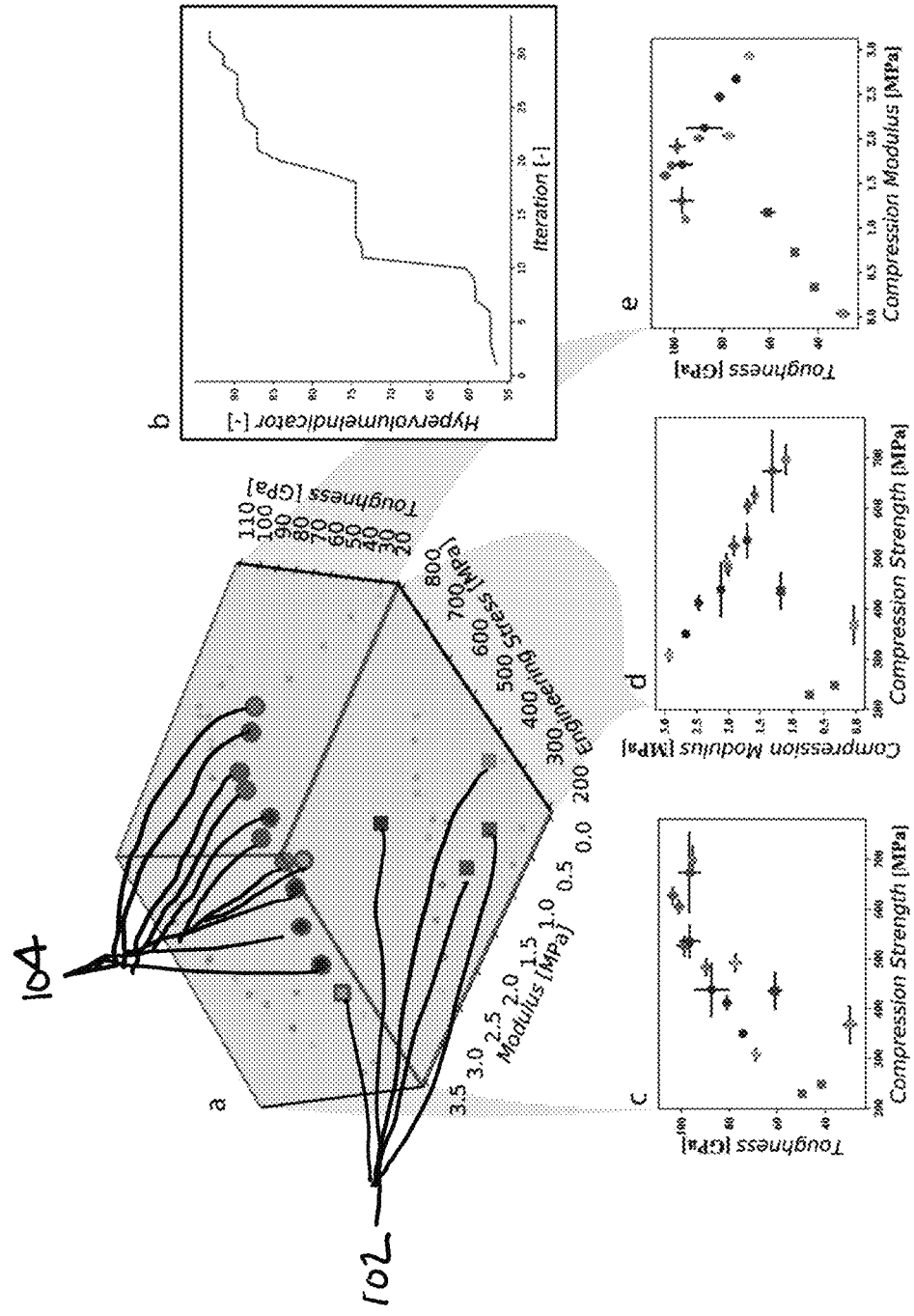
FIG. 9A is a 3D plot of a performance space illustrating results of five primary formulations, and the points of a Pareto front obtained after 30 iterations of the algorithm of FIG. 6B.

More particularly, FIGS. 9A-9E provide the performance results of the 30-algorithm iteration embodiment. FIG. 9A illustrates a 3D plot of the performance space, including the performance of five of the six primary formulations A, B, D, E, F, illustrates by squares 102, and the points on the Pareto front obtained after the 30 algorithm iterations, identified by the larger circles 104. Primary formulation C is missing as it turned out to be too brittle to test in a pure form. The optimization found the final points on the Pareto set at iterations 0 (as one of the primary formulations is Pareto optimal), 10, 18, 20 (2 points), 21, 23, 24, 25, 27, 28, and 30. The formulations with the highest performing compression strength and toughness were found at iteration 28 and 23, respectively.

Furthermore, the hypervolume did not attain a steady-state value before the budget was reached. By further optimizing, more formulations can be attained. After 30 iterations, the optimization algorithm 85 increased the hypervolume indicator of the performance space by more than 325%, as shown in the hypervolume improvement plot of FIG. 9B. The hypervolume indicator shows actual improvement of the Pareto front over iterations of the optimization. The hypervolume of the formulation primaries, initial data set, and final Pareto front are about 2.86e+07, about 5.64e+07, and about 9.32e+07, respectively. This improvement means that by optimized mixing of the current set of formulation primaries, a much broader set of performance parameters can be attained.

Figure 9E:
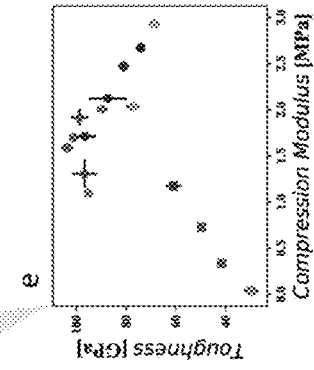
FIG. 9E is a 2D plot comparing a compression modulus and a toughness of formulations of FIG. 9A.
Figure 9D:
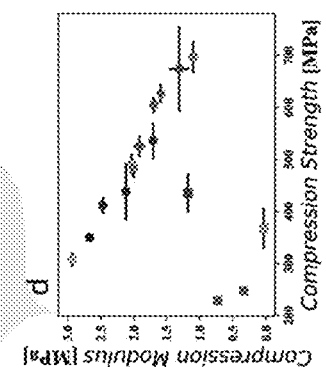
FIG. 9D is a 2D plot comparing a compression strength and a compression modulus of formulations of FIG. 9A.
Figure 9C:
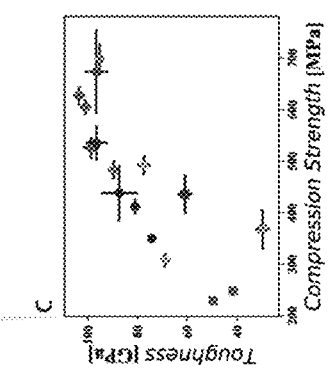
FIG. 9C is a 2D plot comparing a compression strength and a toughness of formulations of FIG. 9A.

FIGS. 9C, 9D, and 9E illustrate two-dimensional plots of the pairs of performance objectives. The formulations in the Pareto set vary in compression strength from about 308 MPa to about 697 MPa. The highest compression strength of the initial six formulation primaries was about 435 MPa of primary B. Compression modulus of optimal solutions approximately spans from about 1.1 MPa to about 2.93 MPa. The optimization yielded no formulation with a higher compression modulus than F; hence, the pure F formulation lies on the final Pareto set. Pareto front toughness varies from about 68.6 GPa of pure F, the formulation primary with the highest modulus, to about 103.6 GPa.

Figure 10:
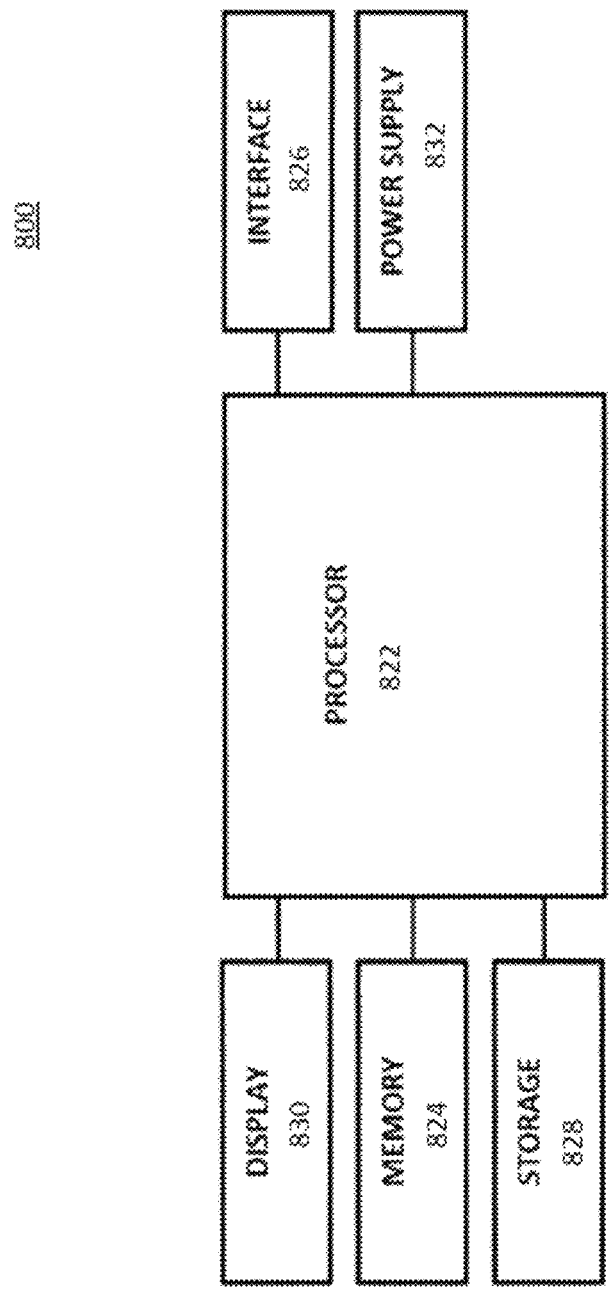
FIG. 10 is a schematic block diagram of one exemplary embodiment of a computer system for operating at least one of an optimization engine and a sample automation system of the system of FIG. 1.

Controller of Other Similar Systems to Operate the Disclosed Systems and Perform the Disclosed Methods FIG. 10 illustrates a block diagram of the physical components of an exemplary embodiment of a controller or other computer 800 that can be used to help control the various features of the sample automation system and/or the optimization engine. For example, as described above, the controller 800 (or a plurality of controllers) can be used to operate the optimization engine, including outputting the next samples to test and/or outputting the Pareto set and front. Such information can be presented to the sample automation system and/or displayed to a user, such as on a display device (e.g., screen or other devices described below or otherwise known to those skilled in the art) or otherwise outputted for viewing by the user (e.g., printed, such as on paper or other medium). Additionally, or alternatively, the controller 800 (or a plurality of controllers) can be used to operate the various features of the sample automation system, such as controlling the ratios of ingredients dispensed to form the primary formulations. Although an exemplary computer 800 is depicted and described herein, it will be appreciated that this is for sake of generality and convenience. In other embodiments, the controller or computer 800 may differ in architecture and operation from that shown and described here. The computer 800 can be a tablet computer, mobile device, smart device, wearable device, smart phone, laptop computer, desktop computer, cloud-based computer, server computer, multiple of the above, and so forth.

The illustrated computer 800 can include a processor 822 that controls the operation of the computer, for example, by executing embedded software (e.g., the optimization algorithm), operating systems, device drivers, application programs, and so forth. The processor 822 can include any type of microprocessor or central processing unit (CPU), including programmable general-purpose or special-purpose processors and/or any of a variety of proprietary or commercially-available single or multi-processor systems. As used herein, the term processor can refer to microprocessors, microcontrollers, ASICs, FPGAs, PICs, processors that read and interpret program instructions from internal or external memory or registers, and so forth. The computer 800 can include a memory 824, which can provide temporary or permanent storage for code to be executed by the processor 822 or for data that is processed by the processor. The memory 824 can include read-only memory (ROM), flash memory, one or more varieties of random access memory (RAM), and/or a combination of memory technologies. The various components of the computer 800 can be interconnected via any one or more separate traces, physical busses, communication lines, etc.

The computer 800 can include an interface 826, such as a communication interface or an I/O interface. A communication interface can enable the computer 800 to communicate with remote devices (e.g., other controllers or computer systems, including but not limited to the aspects or components of the sample automation system) over a network or communications bus (e.g., a universal serial bus). An I/O interface can facilitate communication between one or more input devices, one or more output devices, and the various other components of the computer 800. For example, the interface 826 can communicate with the computer components of a second computer (e.g., an integrated radio of the second computer). Exemplary input devices include touch screens, mechanical buttons, keyboards, and pointing devices. Additional exemplary output devices include a projector, electronic display screens, and speakers. The computer 800 can include a storage device 828, which can include any conventional medium for storing data in a non-volatile and/or non-transient manner. The storage device 828 can thus hold data and/or instructions in a persistent state (i.e., the value is retained despite interruption of power to the computer 800). The storage device 828 can include one or more hard disk drives, flash drives, USB drives, optical drives, various media disks or cards, and/or any combination thereof and can be directly connected to the other components of the computer 800 or remotely connected thereto, such as through the communication interface. The computer 800 can include a display 830, and can generate images to be displayed thereon. In some embodiments, the display 830 can be a vacuum fluorescent display (VFD), an organic light-emitting diode (OLED) display, or a liquid crystal display (LCD). The computer 800 can include a power supply 832 and appropriate regulating and conditioning circuitry. Exemplary power supplies include batteries, such as polymer lithium ion batteries, or adapters for coupling the computer 800 to a DC or AC power source (e.g., a USB adapter or a wall adapter).

A person skilled in the art, in view of the present disclosures, would understand various ways by which computer implementation can be incorporated into or otherwise used with the analysis system 100 of FIG. 1, and/or other such systems either provided for herein or otherwise derivable from the present disclosures.

One skilled in the art will appreciate further features and advantages of the disclosure based on the above-described embodiments. Accordingly, the disclosure is not to be limited by what has been particularly shown and described, except as indicated by the appended claims. For example, while the present disclosure describes embodiments related to use of the systems and methods in conjunction with deriving optimal 3D printing inks, the systems and methods are by no means limited to such use. Rather, the systems and methods can be employed across most any field where materials are used and creating optimal materials may be desirable. All publications and references cited herein are expressly incorporated herein by reference in their entirety.

What is claimed is:

1. A system for formulating a material, comprising:
    a sample automation system configured to output one or more batches of material samples, each batch of the one or more batches including a plurality of material samples, and at least one of the following comprising samples having different properties: (a) the plurality of material samples of each batch, or (b) the material samples of a plurality of batches; and
    an optimization engine configured to receive data about the one or more batches of material samples outputted by the sample automation system and output one or more subsequently suggested batches of material samples, each subsequently suggested batch of the one or more subsequently suggested batches including a plurality of subsequently suggested material samples, the plurality of subsequently suggested material samples comprising material samples having a plurality of different formulations selected from a design space comprising a set of possible formulations,
    wherein the optimization engine is configured to generate, for each of a plurality of performance objectives, predicted performance characteristics of the design space based on the received data,
    wherein the optimization engine is configured to determine, for each of the plurality of performance objectives, a predicted Pareto front based on the predicted performance characteristics of the design space,
    wherein the optimization engine is configured to select the plurality of different formulations from untested regions of the design space based on the predicted Pareto front for at least one of the plurality of performance objectives, and
    wherein the sample automation system is configured to output one or more additional batches of material samples based on the one or more subsequently suggested batches of material samples outputted by the optimization engine.

2. The system of claim 1, wherein the optimization engine is configured to determine a quality of a Pareto front for each of the plurality of performance objectives and wherein the optimization engine is configured to select the plurality of different formulations based on at least one of: a predicted improvement of the quality of the Pareto front for at least one of the plurality of performance objectives or a predicted reduction in an uncertainty of at least one of the predicted performance characteristics of the design space.

3. The system of claim 2, wherein the plurality of performance objectives comprises an overall Pareto front, the overall Pareto front being based on attempts to maximize each of material toughness, compression modulus, and maximum strength simultaneously.

4. The system of claim 3, wherein the optimization engine is configured to utilize a Bayesian optimization strategy to optimize the plurality of different formulations of the material sample based on the plurality of performance objectives.

5. The system of claim 4, wherein the optimization engine is configured to perform the following actions:
    fit a Gaussian Process for each performance objective of the plurality of performance objectives independently;
    perform Thompson sampling of the Gaussian Process for each performance objective;
    approximate a predicted Pareto set and the predicted Pareto front for each performance objective; and
    output the plurality of different formulations of material samples based on the predicted Pareto sets and the predicted Pareto fronts of the plurality of different formulations of material samples outputted by the sample automation system.

6. The system of claim 1, wherein the optimization engine is configured to predict a plurality of performance characteristics for one or more material samples not yet outputted by the sample automation system and factor in such one or more material samples not yet outputted by the sample automation system in determining the one or more subsequently suggested batches of material samples it outputs.

7. The system of claim 6, wherein the optimization engine is configured to utilize a Bayesian optimization strategy to predict the plurality of performance characteristics for the one or more material samples not yet outputted by the sample automation system.

8. The system of claim 1, wherein the sample automation system further comprises:
a plurality of dispensers; and
one or more mixers.

9. The system of claim 8,
wherein the plurality of dispensers are configured to dispense a plurality of formulation primaries, and
wherein the one or more mixers are configured to mix the plurality of formulation primaries based on a selected ratio for the plurality of formulation primaries to create at least one material sample of the plurality of material samples.

10. The system of claim 9, wherein the selected ratio is based on the one or more subsequently suggested batches of material samples outputted by the optimization engine.

11. The system of claim 10, wherein the plurality of formulation primaries are configured for use as 3D printing ink.

12. The system of claim 1, wherein the one or more subsequently suggested batches of material samples outputted by the optimization engine is based on providing one or more subsequently suggested batches that at least one of maximizes a particular function of the material sample or reduces an uncertainty in a particular function of the material sample.

* * * * *